US012101618B2

(12) United States Patent
Vasilache et al.

(10) Patent No.: US 12,101,618 B2
(45) Date of Patent: Sep. 24, 2024

(54) QUANTIZATION OF SPATIAL AUDIO DIRECTION PARAMETERS

(71) Applicant: Nokia Technologies Oy, Espoo (FI)

(72) Inventors: Adriana Vasilache, Tampere (FI); Mikko-Ville Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 179 days.

(21) Appl. No.: 17/634,108

(22) PCT Filed: Jul. 27, 2020

(86) PCT No.: PCT/FI2020/050506

§ 371 (c)(1),
(2) Date: Feb. 9, 2022

(87) PCT Pub. No.: WO2021/032908

PCT Pub. Date: Feb. 25, 2021

(65) Prior Publication Data

US 2022/0386056 A1 Dec. 1, 2022

(30) Foreign Application Priority Data

Aug. 16, 2019 (GB) ..................................... 1911805

(51) Int. Cl.
*H04S 7/00* (2006.01)
*G10L 19/008* (2013.01)
(Continued)

(52) U.S. Cl.
CPC .............. *H04S 7/30* (2013.01); *G10L 19/008* (2013.01); *G10L 19/035* (2013.01); *H04S 3/008* (2013.01);
(Continued)

(58) Field of Classification Search
CPC ........ H04S 7/30; H04S 3/008; H04S 2400/01; H04S 2420/03; G10L 19/008; G10L 19/035
See application file for complete search history.

(56) References Cited

U.S. PATENT DOCUMENTS

2014/0355766 A1 12/2014 Morrell et al.
2015/0248889 A1* 9/2015 Dickins .................. G10L 21/02 704/500
(Continued)

FOREIGN PATENT DOCUMENTS

CN 105898669 A 8/2016
EP 2346028 A1 7/2011
(Continued)

OTHER PUBLICATIONS

Extended European Search Report received for corresponding European Patent Application No. 20854826.3, dated Mar. 3, 2023, 8 pages.
(Continued)

*Primary Examiner* — Joseph Saunders, Jr.
(74) *Attorney, Agent, or Firm* — ALSTON & BIRD LLP

(57) ABSTRACT

A method for spatial audio signal encoding comprising: obtaining a plurality of audio direction parameters, wherein each parameter comprises an elevation value and an azimuth value and wherein each parameter has an ordered position; deriving for each of the plurality of audio direction parameters a corresponding derived audio direction parameter (SP) comprising an elevation and an azimuth value, corresponding derived audio direction parameters (SP) being arranged in a manner determined by a spatial utilization defined by the elevation values and the azimuth values of the plurality of audio direction parameters; rotating each derived audio direction parameter (SP) by the azimuth value ($\varphi_0$) of an audio direction parameter in the first position of the plurality
(Continued)

of audio direction parameters and quantizing the rotation to determine for each a corresponding quantized rotated derived audio direction parameter; changing the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters, followed by determining for each of the plurality audio direction parameters a difference between each audio direction parameter and their corresponding quantized rotated derived audio direction parameter; and quantizing a difference for each of the plurality of audio direction parameters, wherein a difference quantization resolution for each of the plurality of audio direction parameters is defined based on a spatial extent of the audio direction parameters.

20 Claims, 10 Drawing Sheets

(51) Int. Cl.
*G10L 19/035* (2013.01)
*H04S 3/00* (2006.01)

(52) U.S. Cl.
CPC ....... *H04S 2400/01* (2013.01); *H04S 2400/11* (2013.01); *H04S 2420/03* (2013.01)

(56) References Cited

U.S. PATENT DOCUMENTS

| | | | | |
|---|---|---|---|---|
| 2018/0184224 | A1* | 6/2018 | McGrath | H04S 7/302 |
| 2019/0098425 | A1* | 3/2019 | Habets | H04S 3/008 |
| 2020/0265851 | A1* | 8/2020 | Fuchs | G10L 19/167 |

FOREIGN PATENT DOCUMENTS

| | | | |
|---|---|---|---|
| EP | 2863657 | A1 | 4/2015 |
| EP | 3588989 | A1 | 1/2020 |
| GB | 2575632 | A | 1/2020 |
| GB | 2586214 | A | 2/2021 |
| WO | 2014/151813 | A1 | 9/2014 |
| WO | 2019/097018 | A1 | 5/2019 |
| WO | 2019/129350 | A1 | 7/2019 |

OTHER PUBLICATIONS

Search Report received for corresponding United Kingdom Patent Application No. 1911805.8, dated Feb. 14, 2020, 4 pages.

International Search Report and Written Opinion received for corresponding Patent Cooperation Treaty Application No. PCT/FI2020/050506, dated Nov. 4, 2020, 18 pages.

Office action received for corresponding Indian Patent Application No. 202247013082, dated Jul. 18, 2022, 6 pages.

Office Action for Korean Application No. 2022-7008536 dated Jul. 12, 2024, 8 pages.

"Information Technology—High efficiency coding and media delivery in heterogeneous environments—Part 3: 3D audio", ISO/IEC DIS 23008-3, (Aug. 5, 2014), 433 pages.

* cited by examiner

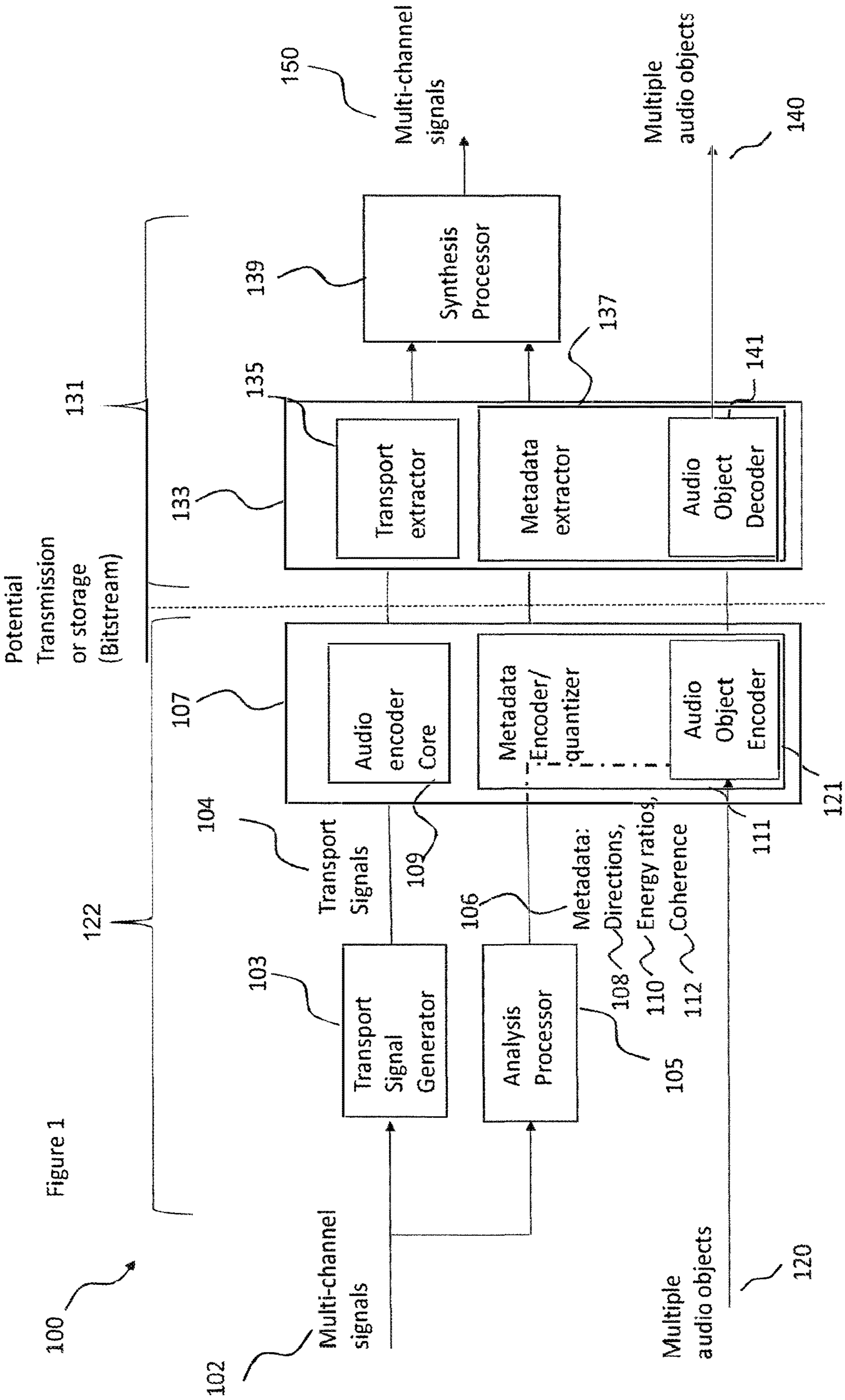
100
102
Multi-channel signals
Figure 1
122
103
Transport Signal Generator
Analysis Processor
105
104
Transport Signals
106
Metadata:
108 Directions,
110 Energy ratios,
112 Coherence
109
Multiple audio objects
120
107
Audio encoder Core
Metadata Encoder/ quantizer
Audio Object Encoder
111
121
Potential Transmission or storage (Bitstream)
131
133
135
Transport extractor
Metadata extractor
Audio Object Decoder
137
141
139
Synthesis Processor
150
Multi-channel signals
Multiple audio objects
140

QUANTIZATION OF SPATIAL AUDIO DIRECTION PARAMETERS

RELATED APPLICATION

This application was originally filed as PCT Application No. PCT/FI2020/050506, filed on Jul. 27, 2020, which claims priority from GB Application No. 1911805.8, filed on Aug. 16, 2019, each of which is incorporated herein by reference in its entirety.

FIELD

The present application relates to apparatus and methods for sound-field related parameter encoding, but not exclusively for direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata for an audio codec. For example, these parameters can be estimated from microphone-array captured audio signals, and for example a stereo signal can be generated from the microphone array signals to be conveyed with the spatial metadata. The stereo signal could be encoded, for example, with an AAC encoder. A decoder can decode the audio signals into PCM signals, and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field.

A further input for the encoder is also multi-channel loudspeaker input, such as 5.1 or 7.1 channel surround inputs.

However, with respect to input audio objects types to an encoder there may be accompanying metadata which comprises directional components of each audio object within a physical space. These directional components may comprise an elevation and azimuth of an audio object's position within the space.

SUMMARY

In a first aspect there is provided a method for spatial audio signal encoding comprising: obtaining a plurality of audio direction parameters, wherein each parameter comprises an elevation value and an azimuth value and wherein each parameter has an ordered position; deriving for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters; rotating each derived audio direction parameter by the azimuth value of an audio direction parameter in the first position of the plurality of audio direction parameters and quantizing the rotation to determine for each a corresponding quantized rotated derived audio direction parameter; changing the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters, followed by determining for each of the plurality audio direction parameters a difference between each audio direction parameter and their corresponding quantized rotated derived audio direction parameter; and quantizing a difference for each of the plurality of audio direction parameters, wherein a difference quantization resolution for each of the plurality of audio direction parameters is defined based on a spatial extent of the audio direction parameters.

Deriving for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters may comprise deriving the azimuth value of each derived audio direction parameter corresponding with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

The number of positions around a circumference of the circle may be determined by a determined number of audio direction parameters.

Rotating each derived audio direction parameter by the azimuth value of a first audio direction parameter of the plurality of audio direction parameters may comprise adding the azimuth value of the first audio direction parameter to the azimuth value of each derived audio direction parameter, wherein the elevation value of each derived audio direction parameter is set to zero.

Quantizing the rotation to determine for each a corresponding quantized rotated derived audio direction parameter may further comprises scalar quantizing the azimuth value of the first audio direction parameter; and the method may further comprise indexing the positions of the audio direction parameters after the changing the ordered position by assigning an index to a permutation of indices representing the order of the positions of the audio direction parameters.

Determining for each of the plurality audio direction parameters a difference between each audio direction parameter and their corresponding quantized rotated derived audio direction parameter may further comprise: determining for each of the plurality of audio direction parameters a difference audio direction parameter based on at least: determining a difference between the first positioned audio direction parameter and the first positioned rotated derived audio direction parameter; and/or determining a difference between a further audio direction parameter and a rotated derived audio direction parameter, wherein the position of the further audio direction parameter is unchanged; and/or determining a difference between a yet further audio direction parameter and a rotated derived audio direction parameter wherein the position of the yet further audio direction parameter has been changed to the position of the rotated derived audio direction parameter.

Changing the position of an audio direction parameter to a further position may apply to any audio direction parameter but the first positioned audio direction parameter.

Quantizing a difference for each of the plurality of audio direction parameters, wherein a difference quantization resolution for each of the plurality of audio direction parameters is defined based on a spatial extent of the audio direction parameters may comprise quantizing the difference audio direction parameter for each of the at least three audio direction parameters as a vector being indexed to a codebook comprising a plurality of indexed elevation values and indexed azimuth values.

The plurality of indexed elevation values and indexed azimuth values may be points on a grid arranged in a form of a sphere, wherein the spherical grid may be formed by covering the sphere with smaller spheres, wherein the smaller spheres define the points of the spherical grid.

Obtaining a plurality of audio direction parameters may comprise receiving the plurality of audio direction parameters.

According to a second aspect there is provided a method for spatial audio signal decoding comprising: obtaining an encoded spatial audio signal; determining a configuration of directional values based on an encoded space utilization parameter within the encoded spatial audio signal; determining a rotation angle based on an encoded rotation parameter within the encoded spatial audio signal; applying the rotation angle to the configuration of directional values to generate a rotated configuration of directional values, the rotated configuration of directional values comprising a first directional value and second and further directional values; determining one or more difference values based on encoded difference values and encoded spatial extent values; applying the one or more difference values to respective second and further respective directional values to generate modified second and further directional values; and reordering the modified second and further directional values based on an encoded permutation index within the encoded spatial audio signal, such that the a first directional value and the reordered modified second and further directional values define audio direction parameters for audio objects.

Determining a configuration of directional values based on an encoded space utilization parameter within the encoded spatial audio signal may comprise deriving an azimuth value of each derived audio direction parameter corresponding with a position of a plurality of positions around the circumference of a circle.

The plurality of positions around the circumference of the circle may be evenly distributed along one of: 360 degrees of the circle when the encoded spatial utilization parameter within the encoded spatial audio signal indicates elevation values and azimuth values of audio direction parameters occupy more than a hemisphere; 180 degrees of the circle when the encoded spatial utilization parameter within the encoded spatial audio signal indicates elevation values and azimuth values of audio direction parameters occupy less than a hemisphere; 90 degrees of the circle when the encoded spatial utilization parameter within the encoded spatial audio signal indicates elevation values and azimuth values of audio direction parameters occupy less than a quadrant of a sphere; and a defined number of degrees of the circle when the encoded spatial utilization parameter within the encoded spatial audio signal indicates elevation values and azimuth values of audio direction parameters occupy less than a threshold range of angles of a sphere.

The number of positions around a circumference of the circle may be determined by a determined number of audio direction parameters.

According to a third aspect there is provided an apparatus for spatial audio signal encoding comprising means configured to: obtain a plurality of audio direction parameters, wherein each parameter comprises an elevation value and an azimuth value and wherein each parameter has an ordered position; derive for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters; rotate each derived audio direction parameter by the azimuth value of an audio direction parameter in the first position of the plurality of audio direction parameters and quantizing the rotation to determine for each a corresponding quantized rotated derived audio direction parameter; change the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters, followed by determining for each of the plurality audio direction parameters a difference between each audio direction parameter and their corresponding quantized rotated derived audio direction parameter; and quantize a difference for each of the plurality of audio direction parameters, wherein a difference quantization resolution for each of the plurality of audio direction parameters is defined based on a spatial extent of the audio direction parameters.

The means configured to derive for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters may be configured to derive the azimuth value of each derived audio direction parameter corresponding with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

The number of positions around a circumference of the circle may be determined by a determined number of audio direction parameters.

The means configured to rotate each derived audio direction parameter by the azimuth value of a first audio direction parameter of the plurality of audio direction parameters may be configured to add the azimuth value of the first audio direction parameter to the azimuth value of each derived audio direction parameter, wherein the elevation value of each derived audio direction parameter may be set to zero.

The means configured to quantize the rotation to determine for each a corresponding quantized rotated derived audio direction parameter may be further configured to scalar quantize the azimuth value of the first audio direction parameter; and the means may be further configured to index the positions of the audio direction parameters after the changing the ordered position by assigning an index to a permutation of indices representing the order of the positions of the audio direction parameters.

The means configured to determine for each of the plurality audio direction parameters a difference between each audio direction parameter and their corresponding quantized rotated derived audio direction parameter may be further configured to: determine for each of the plurality of audio direction parameters a difference audio direction parameter based on at least: determine a difference between the first positioned audio direction parameter and the first positioned rotated derived audio direction parameter; and/or determine a difference between a further audio direction parameter and a rotated derived audio direction parameter, wherein the position of the further audio direction parameter is unchanged; and/or determine a difference between a yet further audio direction parameter and a rotated derived audio direction parameter wherein the position of the yet further audio direction parameter has been changed to the position of the rotated derived audio direction parameter.

The means configured to change the position of an audio direction parameter to a further position may apply to any audio direction parameter but the first positioned audio direction parameter.

The means configured to quantize a difference for each of the plurality of audio direction parameters, wherein a difference quantization resolution for each of the plurality of audio direction parameters is defined based on a spatial extent of the audio direction parameters may be configured to quantize the difference audio direction parameter for each of the at least three audio direction parameters as a vector being indexed to a codebook comprising a plurality of indexed elevation values and indexed azimuth values.

The plurality of indexed elevation values and indexed azimuth values may be points on a grid arranged in a form of a sphere, wherein the spherical grid may be formed by covering the sphere with smaller spheres, wherein the smaller spheres may define the points of the spherical grid.

The means configured to obtain a plurality of audio direction parameters may be configured to receive the plurality of audio direction parameters.

According to a fourth aspect there is provided an apparatus for spatial audio signal decoding comprising means configured to: obtain an encoded spatial audio signal; determine a configuration of directional values based on an encoded space utilization parameter within the encoded spatial audio signal; determine a rotation angle based on an encoded rotation parameter within the encoded spatial audio signal; apply the rotation angle to the configuration of directional values to generate a rotated configuration of directional values, the rotated configuration of directional values comprising a first directional value and second and further directional values; determine one or more difference values based on encoded difference values and encoded spatial extent values; apply the one or more difference values to respective second and further respective directional values to generate modified second and further directional values; and reorder the modified second and further directional values based on an encoded permutation index within the encoded spatial audio signal, such that the a first directional value and the reordered modified second and further directional values define audio direction parameters for audio objects.

The means configured to determine a configuration of directional values based on an encoded space utilization parameter within the encoded spatial audio signal may be configured to derive an azimuth value of each derived audio direction parameter corresponding with a position of a plurality of positions around the circumference of a circle.

The plurality of positions around the circumference of the circle may be evenly distributed along one of: 360 degrees of the circle when the encoded spatial utilization parameter within the encoded spatial audio signal indicates elevation values and azimuth values of audio direction parameters occupy more than a hemisphere; 180 degrees of the circle when the encoded spatial utilization parameter within the encoded spatial audio signal indicates elevation values and azimuth values of audio direction parameters occupy less than a hemisphere; 90 degrees of the circle when the encoded spatial utilization parameter within the encoded spatial audio signal indicates elevation values and azimuth values of audio direction parameters occupy less than a quadrant of a sphere; and a defined number of degrees of the circle when the encoded spatial utilization parameter within the encoded spatial audio signal indicates elevation values and azimuth values of audio direction parameters occupy less than a threshold range of angles of a sphere.

The number of positions around a circumference of the circle may be determined by a determined number of audio direction parameters.

According to a fifth aspect there is provided an apparatus, the apparatus comprising at least one processor and at least one memory including a computer program code, the at least one memory and the computer program code configured to, with the at least one processor, cause the apparatus at least to: obtain a plurality of audio direction parameters, wherein each parameter comprises an elevation value and an azimuth value and wherein each parameter has an ordered position; derive for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters; rotate each derived audio direction parameter by the azimuth value of an audio direction parameter in the first position of the plurality of audio direction parameters and quantize the rotation to determine for each a corresponding quantized rotated derived audio direction parameter; change the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters, and determine for each of the plurality audio direction parameters a difference between each audio direction parameter and their corresponding quantized rotated derived audio direction parameter; and quantize a difference for each of the plurality of audio direction parameters, wherein a difference quantization resolution for each of the plurality of audio direction parameters is defined based on a spatial extent of the audio direction parameters.

The apparatus configured to derive for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters may be caused to derive the azimuth value of each derived audio direction parameter corresponding with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

The number of positions around a circumference of the circle may be determined by a determined number of audio direction parameters.

The apparatus caused to rotate each derived audio direction parameter by the azimuth value of a first audio direction parameter of the plurality of audio direction parameters may be caused to add the azimuth value of the first audio direction parameter to the azimuth value of each derived audio direction parameter, wherein the elevation value of each derived audio direction parameter is set to zero.

The apparatus caused to quantize the rotation to determine for each a corresponding quantized rotated derived audio direction parameter may further be caused to scalar quantize the azimuth value of the first audio direction parameter; and the apparatus may be further caused to index the positions of the audio direction parameters after the changing the ordered position by assigning an index to a permutation of indices representing the order of the positions of the audio direction parameters.

The apparatus caused to determine for each of the plurality audio direction parameters a difference between each audio direction parameter and their corresponding quantized rotated derived audio direction parameter may further be caused to: determine for each of the plurality of audio direction parameters a difference audio direction parameter based on at least: a difference between the first positioned audio direction parameter and the first positioned rotated derived audio direction parameter; and/or a difference between a further audio direction parameter and a rotated derived audio direction parameter, wherein the position of the further audio direction parameter is unchanged; and/or a difference between a yet further audio direction parameter and a rotated derived audio direction parameter wherein the position of the yet further audio direction parameter has been changed to the position of the rotated derived audio direction parameter.

The apparatus caused to change the position of an audio direction parameter to a further position may apply to any audio direction parameter but the first positioned audio direction parameter.

The apparatus caused to quantize a difference for each of the plurality of audio direction parameters, wherein a difference quantization resolution for each of the plurality of audio direction parameters is defined based on a spatial extent of the audio direction parameters may be caused to quantize the difference audio direction parameter for each of the at least three audio direction parameters as a vector being indexed to a codebook comprising a plurality of indexed elevation values and indexed azimuth values.

The plurality of indexed elevation values and indexed azimuth values may be points on a grid arranged in a form of a sphere, wherein the spherical grid may be formed by covering the sphere with smaller spheres, wherein the smaller spheres define the points of the spherical grid.

The apparatus caused to obtain a plurality of audio direction parameters may be caused to receive the plurality of audio direction parameters.

According to a sixth aspect there is provided an apparatus, the apparatus comprising at least one processor and at least one memory including a computer program code, the at least one memory and the computer program code configured to, with the at least one processor, cause the apparatus at least to: obtain an encoded spatial audio signal; determine a configuration of directional values based on an encoded space utilization parameter within the encoded spatial audio signal; determine a rotation angle based on an encoded rotation parameter within the encoded spatial audio signal; apply the rotation angle to the configuration of directional values to generate a rotated configuration of directional values, the rotated configuration of directional values comprising a first directional value and second and further directional values; determine one or more difference values based on encoded difference values and encoded spatial extent values; apply the one or more difference values to respective second and further respective directional values to generate modified second and further directional values; reorder the modified second and further directional values based on an encoded permutation index within the encoded spatial audio signal, such that the a first directional value and the reordered modified second and further directional values define audio direction parameters for audio objects.

The apparatus caused to determine a configuration of directional values based on an encoded space utilization parameter within the encoded spatial audio signal may be caused to derive an azimuth value of each derived audio direction parameter corresponding with a position of a plurality of positions around the circumference of a circle.

The plurality of positions around the circumference of the circle may be evenly distributed along one of: 360 degrees of the circle when the encoded spatial utilization parameter within the encoded spatial audio signal indicates elevation values and azimuth values of audio direction parameters occupy more than a hemisphere; 180 degrees of the circle when the encoded spatial utilization parameter within the encoded spatial audio signal indicates elevation values and azimuth values of audio direction parameters occupy less than a hemisphere; 90 degrees of the circle when the encoded spatial utilization parameter within the encoded spatial audio signal indicates elevation values and azimuth values of audio direction parameters occupy less than a quadrant of a sphere; and a defined number of degrees of the circle when the encoded spatial utilization parameter within the encoded spatial audio signal indicates elevation values and azimuth values of audio direction parameters occupy less than a threshold range of angles of a sphere.

The number of positions around a circumference of the circle may be determined by a determined number of audio direction parameters.

According to a seventh aspect there is provided a computer program for spatial audio signal encoding comprising instructions [or a computer readable medium comprising program instructions] for causing an apparatus to perform at least the following: obtaining a plurality of audio direction parameters, wherein each parameter comprises an elevation value and an azimuth value and wherein each parameter has an ordered position; deriving for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters; rotating each derived audio direction parameter by the azimuth value of an audio direction parameter in the first position of the plurality of audio direction parameters and quantizing the rotation to determine for each a corresponding quantized rotated derived audio direction parameter; changing the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters, followed by determining for each of the plurality audio direction parameters a difference between each audio direction parameter and their corresponding quantized rotated derived audio direction parameter; and quantizing a difference for each of the plurality of audio direction parameters, wherein a difference quantization resolution for each of the plurality of audio direction parameters is defined based on a spatial extent of the audio direction parameters.

According to an eighth aspect there is provided a computer program for spatial audio signal decoding comprising instructions [or a computer readable medium comprising program instructions] for causing an apparatus to perform at least the following: obtaining an encoded spatial audio signal; determining a configuration of directional values based on an encoded space utilization parameter within the encoded spatial audio signal; determining a rotation angle based on an encoded rotation parameter within the encoded spatial audio signal; applying the rotation angle to the configuration of directional values to generate a rotated configuration of directional values, the rotated configuration of directional values comprising a first directional value and second and further directional values; determining one or more difference values based on encoded difference values and encoded spatial extent values; applying the one or more difference values to respective second and further respective directional values to generate modified second and further directional values; and reordering the modified second and further directional values based on an encoded permutation index within the encoded spatial audio signal, such that the a first directional value and the reordered modified second and further directional values define audio direction parameters for audio objects.

According to a ninth aspect there is provided a non-transitory computer readable medium comprising program instructions for causing an apparatus to perform at least the following: obtaining a plurality of audio direction parameters, wherein each parameter comprises an elevation value and an azimuth value and wherein each parameter has an ordered position; deriving for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters; rotating each derived audio direction parameter by the azimuth value of an audio direction parameter in the first position of the plurality of audio direction parameters and quantizing the rotation to determine for each a corresponding quantized rotated derived audio direction parameter; changing the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters, followed by determining for each of the plurality audio direction parameters a difference between each audio direction parameter and their corresponding quantized rotated derived audio direction parameter; and quantizing a difference for each of the plurality of audio direction parameters, wherein a difference quantization resolution for each of the plurality of audio direction parameters is defined based on a spatial extent of the audio direction parameters.

According to a tenth aspect there is provided a non-transitory computer readable medium comprising program instructions for causing an apparatus to perform at least the following: obtaining an encoded spatial audio signal; determining a configuration of directional values based on an encoded space utilization parameter within the encoded spatial audio signal; determining a rotation angle based on an encoded rotation parameter within the encoded spatial audio signal; applying the rotation angle to the configuration of directional values to generate a rotated configuration of directional values, the rotated configuration of directional values comprising a first directional value and second and further directional values; determining one or more difference values based on encoded difference values and encoded spatial extent values; applying the one or more difference values to respective second and further respective directional values to generate modified second and further directional values; and reordering the modified second and further directional values based on an encoded permutation index within the encoded spatial audio signal, such that the a first directional value and the reordered modified second and further directional values define audio direction parameters for audio objects.

According to an eleventh aspect there is provided an apparatus comprising: obtaining circuitry configured to obtain a plurality of audio direction parameters, wherein each parameter comprises an elevation value and an azimuth value and wherein each parameter has an ordered position; deriving circuitry configured to derive for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters; rotating and quantizing circuitry configured to rotate each derived audio direction parameter by the azimuth value of an audio direction parameter in the first position of the plurality of audio direction parameters and quantizing the rotation to determine for each a corresponding quantized rotated derived audio direction parameter; reordering circuitry configured to change the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters; determining circuitry configured to determine for each of the plurality audio direction parameters a difference between each audio direction parameter and their corresponding quantized rotated derived audio direction parameter; and quantizing circuitry configured to quantize a difference for each of the plurality of audio direction parameters, wherein a difference quantization resolution for each of the plurality of audio direction parameters is defined based on a spatial extent of the audio direction parameters.

According to a twelfth aspect there is provided an apparatus comprising obtaining circuitry configured to obtain an encoded spatial audio signal; determining circuitry configured to determine a configuration of directional values based on an encoded space utilization parameter within the encoded spatial audio signal; determining circuitry configured to determine a rotation angle based on an encoded rotation parameter within the encoded spatial audio signal; processing circuitry configured to apply the rotation angle to the configuration of directional values to generate a rotated configuration of directional values, the rotated configuration of directional values comprising a first directional value and second and further directional values; determining circuitry configured to determine one or more difference values based on encoded difference values and encoded spatial extent values; processing circuitry configured to apply the one or more difference values to respective second and further respective directional values to generate modified second and further directional values; and reordering circuitry configured to reorder the modified second and further directional values based on an encoded permutation index within the encoded spatial audio signal, such that the a first directional value and the reordered modified second and further directional values define audio direction parameters for audio objects.

According to a thirteenth aspect there is provided a computer readable medium comprising program instructions for causing an apparatus to perform at least the following: obtaining a plurality of audio direction parameters, wherein each parameter comprises an elevation value and an azimuth value and wherein each parameter has an ordered position; deriving for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters; rotating each derived audio direction parameter by the azimuth value of an audio direction parameter in the first position of the plurality of audio direction parameters and quantizing the rotation to determine for each a corresponding quantized rotated derived audio direction parameter; changing the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters, followed by determining for each of the plurality audio direction parameters a difference between each audio direction parameter and their corresponding quantized rotated derived audio direction parameter; and quantizing a difference for each of the plurality of audio direction parameters, wherein a difference quantization resolution for each of the plurality of audio direction parameters is defined based on a spatial extent of the audio direction parameters.

According to a fourteenth aspect there is provided a computer readable medium comprising program instructions for causing an apparatus to perform at least the following: obtaining an encoded spatial audio signal; determining a configuration of directional values based on an encoded space utilization parameter within the encoded spatial audio signal; determining a rotation angle based on an encoded rotation parameter within the encoded spatial audio signal; applying the rotation angle to the configuration of directional values to generate a rotated configuration of directional values, the rotated configuration of directional values comprising a first directional value and second and further directional values; determining one or more difference values based on encoded difference values and encoded spatial extent values; applying the one or more difference values to respective second and further respective directional values to generate modified second and further directional values; and reordering the modified second and further directional values based on an encoded permutation index within the encoded spatial audio signal, such that the a first directional value and the reordered modified second and further directional values define audio direction parameters for audio objects.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 1 shows schematically a system of apparatus suitable for implementing some embodiments;

EMBODIMENTS OF THE APPLICATION

Figure 2:
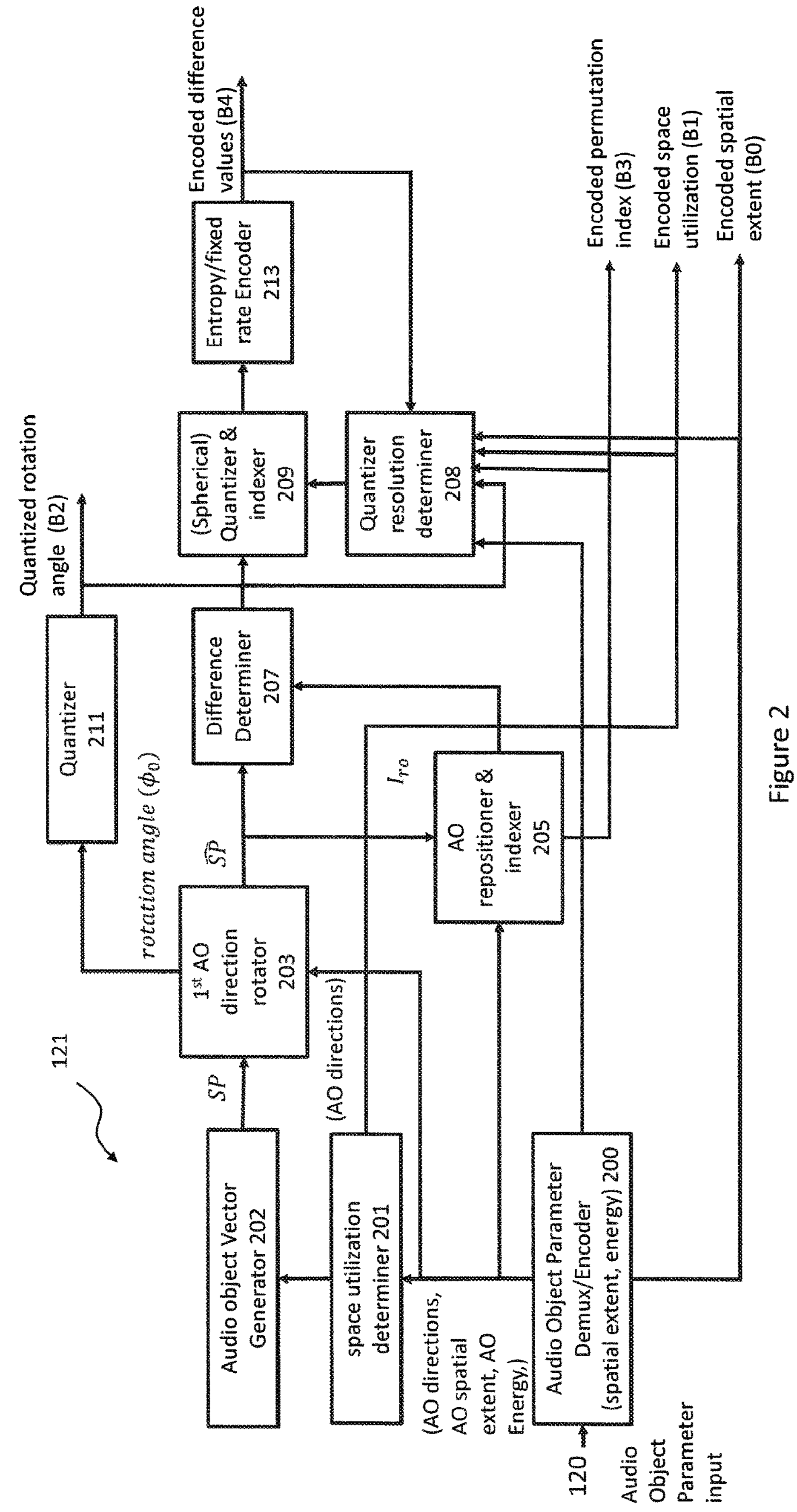
FIG. 2 shows schematically the audio object encoder as shown in FIG. 1 according to some embodiments.

The following describes in further detail suitable apparatus and possible mechanisms for the provision of effective spatial analysis derived metadata parameters for multi-channel input format audio signals and input audio objects. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore the output of the example system is a multi-channel loudspeaker arrangement. However it is understood that the output may be rendered to the user via means other than loudspeakers. Furthermore, the multi-channel loudspeaker signals may be generalised to be two or more playback audio signals.

As discussed previously spatial metadata parameters such as direction and direct-to-total energy ratio (or diffuseness-ratio, absolute energies, or any suitable expression indicating the directionality/non-directionality of the sound at the given time-frequency interval) parameters in frequency bands are particularly suitable for expressing the perceptual properties of natural sound fields. Synthetic sound scenes such as 5.1 loudspeaker mixes commonly utilize audio effects and amplitude panning methods that provide spatial sound that differs from sounds occurring in natural sound fields. In particular, a 5.1 or 7.1 mix may be configured such that it contains coherent sounds played back from multiple directions. For example, it is common that some sounds of a 5.1 mix perceived directly at the front are not produced by a centre (channel) loudspeaker, but for example coherently from left and right front (channels) loudspeakers, and potentially also from the centre (channel) loudspeaker. The spatial metadata parameters such as direction(s) and energy ratio(s) do not express such spatially coherent features accurately. As such other metadata parameters such as coherence parameters may be determined from analysis of the audio signals to express the audio signal relationships between the channels.

In addition to multi-channel input format audio signals an encoding system may also be required to encode audio objects representing various sound sources within a physical space. Each audio object can be accompanied, whether it is in the form of metadata or some other mechanism, by directional data in the form of azimuth and elevation values which indicate the position of an audio object within a physical space.

As expressed above an example of the incorporation of direction information for audio objects as metadata is to use determined azimuth and elevation values. However conventional uniform azimuth and elevation sampling produces a non-uniform direction distribution.

The concept I in the embodiments herein is the use of components of the object metadata, such as gain and spatial extent to determine the quantization resolution of the directional information for each object. In addition in some embodiments in order to ensure that there are no jumps in the object position the quantization is implemented such that the time evolution of the quantized angle value follows the time evolution of the non-quantized angle values.

The proposed directional index for audio objects may then be used alongside a downmix signal ('channels'), to define a parametric immersive format that can be utilized, e.g., for the Immersive Voice and Audio Service (IVAS) codec.

In the following the decoding of such indexed direction parameters to produce quantised directional parameters which can be used in synthesis of spatial audio based on audio object sound-field related parameterization is also discussed.

With respect to FIG. 1 an example apparatus and system for implementing embodiments of the application are shown. The system 100 is shown with an 'analysis' part 122 and a 'synthesis' part 131. The 'analysis' part 122 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 122 is the multi-channel signals 102. In the following examples a microphone channel signal input is described, however any suitable input (or synthetic multi-channel) format may be implemented in other embodiments.

The multi-channel signals are passed to a downmixer 103 and to an analysis processor 105.

In some embodiments the downmixer 103 is configured to receive the multi-channel signals and downmix the signals to a determined number of channels and output the downmix signals 104. For example the downmixer 103 may be configured to generate a 2 audio channel downmix of the multi-channel signals. The determined number of channels may be any suitable number of channels. In some embodiments the downmixer 103 is optional and the multi-channel signals are passed unprocessed to an encoder 107 in the same manner as the downmix signal are in this example.

In some embodiments the analysis processor 105 is also configured to receive the multi-channel signals and analyse the signals to produce metadata 106 associated with the multi-channel signals and thus associated with the downmix signals 104. The analysis processor 105 may be configured to generate the metadata which may comprise, for each time-frequency analysis interval, a direction parameter 108, an energy ratio parameter 110, a coherence parameter 112, and a diffuseness parameter 114. The direction, energy ratio and diffuseness parameters may in some embodiments be considered to be spatial audio parameters. In other words the spatial audio parameters comprise parameters which aim to characterize the sound-field created by the multi-channel signals (or two or more playback audio signals in general). The coherence parameters may be considered to be signal relationship audio parameters which aim to characterize the relationship between the multi-channel signals.

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The downmix signals 104 and the metadata 106 may be passed to an encoder 107.

The encoder 107 may comprise an IVAS stereo core 109 which is configured to receive the downmix (or otherwise) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder or quantizer 109 which is configured to receive the metadata and output an encoded or compressed form of the information. Additionally, there may also be an audio object encoder 121 within the encoder 107 which in embodiments may be arranged to encode data (or metadata) associated with the multiple audio objects along the input 120. The data associated with the multiple audio objects may comprise at least in part directional data.

In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a downmix extractor 135 which is configured to decode the audio signals to obtain the downmix signals. Similarly, the decoder/demultiplexer 133 may comprise a metadata extractor 137 which is configured to receive the encoded metadata and generate metadata. Additionally, the decoder/demultiplexer 133 may also comprise an audio object decoder 141 which can be configured to receive encoded data associated with multiple audio objects and accordingly decode such data to produce the corresponding decoded data 140. The decoder/demultiplexer 133 can in some embodiments be a computer (running suitable software stored on memory and on at least one processor), or alternatively a specific device utilizing, for example, FPGAs or ASICs.

The decoded metadata and downmix audio signals may be passed to a synthesis processor 139.

The system 100 'synthesis' part 131 further shows a synthesis processor 139 configured to receive the downmix and the metadata and re-creates in any suitable format a synthesized spatial audio in the form of multi-channel signals 150 (these may be multichannel loudspeaker format or in some embodiments any suitable output format such as binaural or Ambisonics signals, depending on the use case) based on the downmix signals and the metadata.

In some embodiments there may be an additional input 120 which may specifically comprise directional data associated with multiple audio objects. One particular example of such a use case is a teleconference scenario where participants are positioned around a table. Each audio object may represent audio data associated with each participant. In particular the audio object may have positional data associated with each participant. The data associated with the audio objects is depicted in FIG. 1 as being passed to the audio object encoder 121. In the following examples the encoding of the audio object metadata is based on the additional input 120 audio object information only. It may be possible in some embodiments to also obtain (as shown by the dashed line) audio object metadata determined by the analysis processor 105 according to any suitable analysis method. However the obtaining of this audio object metadata and the use thereof is not herein described in detail.

The system 100 can thus in some embodiments be configured to accept multiple audio objects with associated metadata such as direction (or position), spatial extent, gain, energy/power values, energy ratios, coherence etc along the input 120 or from the analysis processor 105. The audio objects with the associated directional data may be passed to a metadata encoder/quantizer 111 and in some embodiments a specific audio object encoder 121 for encoding and quantizing the metadata.

To that extent the directional data associated with each audio object can be expressed in terms of azimuth $\varphi$ and elevation $\theta$, where the azimuth value and elevation value of each audio object indicates the position of the object in space at any point in time. The azimuth and elevation values can be updated on a time frame by time frame basis which does not necessarily have to coincide with the time frame resolution of the directional metadata parameters associated with the multi-channel audio signals.

In general, the directional information for N active input audio objects to the audio object encoder 121 may be expressed in the form of $P_q=(\theta_q,\phi_q)$, q=0:N−1, where $P_q$ is the directional information of an audio object with index q having a two dimensional vector comprising elevation $\theta$ value and the azimuth $\varphi$ value.

The concept herein is to generate an encoding of audio objects based on the arrangement of the audio objects and their associated parameters. For example in some embodiments a vector of "template" directions is generated based on the arrangement of audio objects and their associated parameters. In some embodiments the quantization of any difference between the directional information of an audio object and a "template" direction vector derived for that arrangement of audio objects and their associated parameters (for example using a spherical quantization scheme) can be based on the arrangement of audio objects and their associated parameters.

In this regard FIG. 2*a* depicts some of the functionality of the audio object encoder 121 in more detail.

The audio object encoder 121 can comprise in some embodiments an audio object parameter demultiplexer (Demux)/encoder 200. The audio object parameter demultiplexer (Demux)/encoder 200 can be configured to receive the audio object parameter input 120 and determine or obtain or demultimplex parameters associated with the audio objects from the input. For example as shown in FIG. 2*a* is shown the audio object parameter demultiplexer (Demux)/encoder 200 generating or obtaining otherwise the directions associated with each audio object, a spatial extent associated with each audio object and the energy associated with each audio object. In some embodiments the spatial extent of each audio object is encoded using B0 bits.

The audio object encoder 121 can comprise a space utilization determiner 201. The space utilization determiner 201 can be configured to receive all of the directions of all of the audio objects and determine the range of the azimuth and elevation which contain all of the audio objects. In some embodiments the space utilization determiner 201 is configured to determine the utilization of the space based on the audio objects. The utilization of the space based on the audio objects can be whether all of the audio objects are within a hemisphere (and identify which hemisphere or the centre or mean of the hemisphere), whether all of the audio objects are within a quadrant of the sphere (and identify which quadrant or the centre or mean of the quadrant) or identify whether the range is more than (or less than) a defined range threshold). In some embodiments the results of this determination can be encoded (for example using 1 bit to identify which hemisphere, 2 bits to identify which quadrant etc). Thus in some embodiments this information can be encoded using B1 bits. The identified space utilization may furthermore be passed to the audio object vector generator 202.

The audio object encoder 121 can comprise an audio object vector generator 202. The audio object vector generator 202 is arranged to derive a suitable initial "template" direction for each audio object. The initial "template" direction for each object (which may be in a vector format) can in some embodiments be generated based on the identified space utilization. For example, in some embodiments, the audio object vector generator 202 is configured to generate a vector having N derived directions corresponding to the N audio objects. Where the space utilization is over the complete sphere (in other words not determined to be within a hemisphere, quadrant or other determined range) then the initial "template" directions may be distributed around the circumference of a circle. In particular embodiments the derived directions can be considered from the viewpoint of the audio objects directions being evenly distributed as N equidistant points around a unit circle.

In some embodiments the N derived directions are disclosed as being formed into a vector structure (termed a vector, SP) with each element corresponding to the derived direction for one of the N audio objects. However, it is to be understood that the vector structure is not a necessary requirement, and that the following disclosure can be equally applied by considering the audio objects as a collection of indexed audio objects which do not have to be necessarily structured in the form of vectors.

The audio object vector generator 202 can thus be configured to derive a "template" derived vector SP having N two dimensional elements, whereby each element represents the azimuth and elevation associated with an audio object. The vector SP (for the whole sphere space utilization determination) may then be initialised by setting the azimuth and elevation value of each element such that the N audio objects are evenly distributed around a unit circle. This can be realised by initializing each audio object direction element within the vector to have an elevation value of zero and an azimuth value of $$q \cdot \frac{360}{N}$$

where q is the index of the associated audio object. Therefore, the vector SP can be written for the N audio objects as:

$$SP = \left(0, 0; 0, \frac{360}{N}; 0, 2 \cdot \frac{360}{N}; \ldots ; 0, (N-1) \cdot \frac{360}{N}\right)$$

In other words, the SP vector can be initialised so that the directional information of each audio object is presumed to be distributed evenly along a unit circle starting at an azimuth value of 0°.

In some embodiments where the space utilization is determined to be within a hemisphere then the audio object vector generator 202 can be configured to derive a "template" derived vector SP (for the hemisphere space utilization determination) initialised by setting the azimuth and elevation value of each element such that the N audio objects are evenly distributed around a half circle. This can be realised by initializing each audio object direction element within the vector to have an elevation value of zero and an azimuth value of $$q \cdot \frac{180}{N}$$

where q is the index of the associated audio object. Therefore, the vector SP can be written for the N audio objects as:

$$SP = \left(0, 90; 0, 90 - \frac{180}{N}; 0, 90 - \frac{2.180}{N}; \ldots ; 0, 90 - \frac{(N-1)180}{N}\right)$$

In other words, the SP vector can be initialised so that the directional information of each audio object is presumed to be distributed evenly along a half circle with a unit radius starting at an azimuth value of 90° and extending to −90°.

Similarly where the space utilization is determined to be within a quadrant then the audio object vector generator 202 can be configured to derive a "template" derived vector SP (for the quadrant space utilization determination) initialised by setting the azimuth and elevation value of each element such that the N audio objects are evenly distributed around a quarter circle. This can be realised by initializing each audio object direction element within the vector to have an elevation value of zero and an azimuth value of $$q \cdot \frac{90}{N}$$

where q is the index of the associated audio object. Therefore, the vector SP can be written for the N audio objects as:

$$SP=\left(0,45;0,45-\frac{90}{N};0,45-\frac{2\cdot 90}{N};\ldots;0,45-\frac{(N-1)\cdot 90}{N}\right)$$

In other words, the SP vector can be initialised so that the directional information of each audio object is presumed to be distributed evenly along a half circle with a unit radius starting at an azimuth value of 45° and extending to −45°. This can be extended to any suitable extent range. In some embodiments where the extent in azimuth or elevation differs one or the other of the extents may be used to define the template range. Thus for example there may be templates associated with the elevation.

The derived SP vector having elements comprising the derived directions corresponding to each audio object may then be passed to the 1st audio object direction rotator 203 in the audio object encoder 121.

The audio object encoder 121 can comprise a 1st audio object direction rotator 203. The 1st audio object direction rotator 203 is configured to receive the derived vector SP and furthermore at least one of the audio object directions. The 1st audio object direction rotator 203 is then configured to determine from the direction parameter of the first audio object a rotation angle which orientates the 1st audio object with one of the vector elements. This can be seen as rotating all directions such that the direction of the first object is closest to the "front" direction and the sum distances for all directions with respect to each component of the supervector is minimized.

The functional block may then rotate each derived direction within the SP vector by the azimuth value of the first component $\phi_0$ from the first received audio object $P_0$. That is each azimuth component of each derived direction within the derived vector SP may be rotated by adding the value of the first azimuth component $\phi_0$ of the first received audio object. In terms of the SP vector this operation results in each element having the following form, $$\widehat{SP}=\left(0,0+\phi_0;0,\frac{360}{N}+\phi_0;0,2\cdot\frac{360}{N}+\phi_0;\ldots;0,(N-1)\cdot\frac{360}{N}+\phi_0\right).$$

In terms of just solely the azimuth angles, $$\widehat{SP}=(\hat{\phi}_0;\hat{\phi}_1;\hat{\phi}_2;\ldots;\hat{\phi}_{N-1})$$

where $\hat{\phi}_i$ is the rotated azimuth component given by $$i\cdot\frac{360}{N}+\phi_0$$

and $\widehat{SP}$ is the rotated SP vector.

As a result of this step the rotated derived vector $\widehat{SP}$ is now aligned to the direction of the first audio object on the unit circle.

A similar rotation of each derived direction within the SP vector by the azimuth value of the first component $\phi_0$ from the first received audio object $P_0$. In some embodiments the first component $\phi_0$ from the first received audio object $P_0$ is the component which is closest to the mean of all of the components. For example $\phi_0$ closest to $\overline{\phi_0,\ldots,\phi_{N-1}}$. That is each azimuth component of each derived direction within the derived vector SP may be rotated such that the mode or one of the two mode vector elements is aligned to the first component. Thus for example rather than using the first object as reference the others can be tried as well, especially for the finer quantization resolution cases which allows the use of bits for selecting the reference object.

As a result of this step the rotated derived vector $\widehat{SP}$ has one element which is aligned to the direction of the first audio object. The rotated derived vector $\widehat{SP}$ can in some embodiments then be passed to a difference determiner 207 and furthermore to an audio object repositioner and indexer 205. Additionally the rotation angle can be passed to a quantizer 211.

The audio object encoder 121 can comprise a quantizer 211 configured to receive the rotation angle. The quantizer 211 furthermore is configured to quantize the rotation angle. For example, a linear quantizer with a resolution of 2.5 degrees (that is 5 degrees between consecutive points on the linear scale) results in 72 linear quantization levels. It is to be noted that the derived vector SP would be known at both the encoder and decoder because the number of active objects would be fixed at N. if all the sphere space is used for the vector then in some embodiments B2=7 bits can be used to quantize the rotation in the horizontal space (in some embodiments B2=6 bits are used where only one hemisphere is used, and B2=5 bits are used when only a quadrant is used. The quantized rotation angle is also passed to the difference determiner 207.

The audio object encoder 121 can also comprise an audio direction repositioner & indexer 205 configured to reorder the position of the received audio objects to align more closely to the derived directions of the elements of the rotated derived vector $\widehat{SP}$.

This may be achieved by reordering the position of the audio objects such that the azimuth value of each reordered audio object is aligned with the element position having the closest azimuth value in the rotated derived vector $\widehat{SP}$. The reordered positions of each audio object may then be encoded as a permutation index. This process may comprise the following algorithmic steps:

1. Assigning an index to each active audio object in the order received, as a vector this may be expressed as $I=(i_0, i_1, i_2 \ldots i_{N-1})$.
2. Rearrange all but the first index $i_0$, so that an index $i_i$ which is currently in position i is moved to position j if the azimuth angle associated with the audio object $\phi_i$ is closest to the azimuth angle $\hat{\phi}_j$ at position j out of all azimuth angles in the rotated derived vector $\widehat{SP}$.

For an example comprising four active audio objects. The SP codevector may be initialised evenly along the unit circle as SP=(0, 0; 0, 90; 0, 180; 0, 270). The directional data associated with the four audio objects:

$$((\theta_0,\phi_0);(\theta_1,\phi_1);\ldots(\theta_{N-1},\phi_{N-1})),$$

may be received as:

$$((0,130);(0,210);(0,39);(0,310),$$

in which the first $\phi_0$ is given as 130 degrees. In this particular example the rotated azimuth angles in the vector $\widehat{SP}$ are given by (0+130, 90+130, 180+130, 270+130)=(130; 220; 310; 400)=(130, 220, 310, 40). In this example the second audio object with azimuth angle 210 closest to the second azimuth angle in the vector $\widehat{SP}$, the third audio object with azimuth angle 30 is closest to the fourth azimuth angle in the vector $\widehat{SP}$ and the fourth audio object with azimuth angle

310 is closest to the third azimuth angle in the vector $\widehat{SP}$. Therefore, in this case the reordered audio object index vector is $\hat{I}=(i_0, i_1, i_3, i_2)$.

3. The reordered audio object index vector may then be indexed according to the particular permutation of the indices within the vector. Each particular permutation of indices within the vector may be assigned an index value. However, it is to be understood that the first index position of the reordered audio object index vector is not part of the permutation of indices as the index of the first element in the vector does not change. That is first audio object always remains in the first position because this is the audio object towards which the derived vector SP is rotated. Therefore, there are a possible (N−1)! permutations of indices of the reordered audio object index vector which can be represented within the bounds of $\log_2((N-1)!)$ bits.

Returning to the above example of a system having 4 active audio objects it is only the indices of $i_3$, $i_1$, $i_2$ that need to be indexed. The indexing for the possible permutations of indices of the reordered audio object index vector for the above demonstrative example may take the following form

| Index | order of indices of re ordered audio objects |
|---|---|
| 0 | $i_i, i_2, i_3$ |
| 1 | $i_1, i_3, i_2$ |
| 2 | $i_2, i_1, i_3$ |
| 3 | $i_2, i_3, i_1$ |
| 4 | $i_3, i_1, i_2$ |
| 5 | $i_3, i_2, i_1$ |

Therefore, to summarize the rotated derived vector $\widehat{SP}$ can be encoded for transmission by quantizing the azimuth of the first object $\phi_0$. Additionally the positions of the ordered active audio object positions are required to be transmitted as well. The permutation index can for example be encoded using B3 bits, where the Index, $I_{ro}$ representing the order of indices of the audio direction parameters of the audio objects 1 to N−1 can form part of an encoded bitstream such as that from the encoder 100.

In some embodiments the audio object encoder 121 can also comprise a difference determiner 207. The difference determiner 207 is configured to receive the rotated derived vector $\widehat{SP}$, the quantized rotation angle and the indexed audio object positions and determine a difference vector between the rotated derived $\widehat{SP}$ vector and the directional data of each audio object. In some embodiments the directional difference vector can be a 2-dimensional vector having an elevation difference value and an azimuth difference value. In some embodiments the azimuth difference value is furthermore evaluated with respect to the difference between the rotated derived vector and the quantized rotation angle. In other words the difference takes into account the quantization of the rotation angle to reflect the difference between the indexed audio position and the quantized rotation rather than the indexed audio position and the rotation.

For instance, the directional difference vector for an audio object $P_i$ with directional components $(\theta_i,\phi_i)$ can be found as $$(\Delta\theta_1,\Delta\phi_i)=(\theta_i-\hat{\theta}_i,\phi_i-\hat{\phi}_\iota q)$$

Where $\hat{\phi}_\iota q$ is the quantized rotation angle.

In practice however, $\Delta\theta_i$ may be $\theta_i$ because the elevation components of the above SP codevector are zero. However, it is to be understood that other embodiments may derive a vector SP in which the elevation component is not zero, in these embodiments an equivalent rotation change may be applied to the elevation component of each element of the derived vector SP. That is the elevation component of each element of the derived vector SP may be rotated by (or aligned to) the first audio object's elevation.

It is to be understood that the directional difference for an audio object $P_i$ is formed based on the difference between each element of the rotated derived vector $\widehat{SP}$ and the corresponding reordered (or repositioned) audio object direction.

It is to be further understood that the above description has been laid out in terms of repositioning (or rearranging) the order of the audio objects however the above description is equally valid for the repositioning of just the audio direction parameters rather than the repositioning of the whole audio objects. The difference vector may then be passed to a (spherical) quantizer & indexer 209.

In some embodiments the audio object encoder 121 can also comprise a quantizer resolution determiner 208. The quantizer resolution determiner 208 is configured to receive the bits used to encode the spatial extent (B0), the encoded space utilization (B1) the encoded permutation index (B3) and encoded difference values (B4). Additionally in some embodiment the quantizer resolution determiner 208 is configured to receive the indication of the audio object spatial extents (the dispersion of the audio objects). In some embodiments the quantizer resolution determiner 208 is then configured to determine a suitable quantization resolution which is provided to the (spherical) quantizer & indexer 209.

Figure 3:
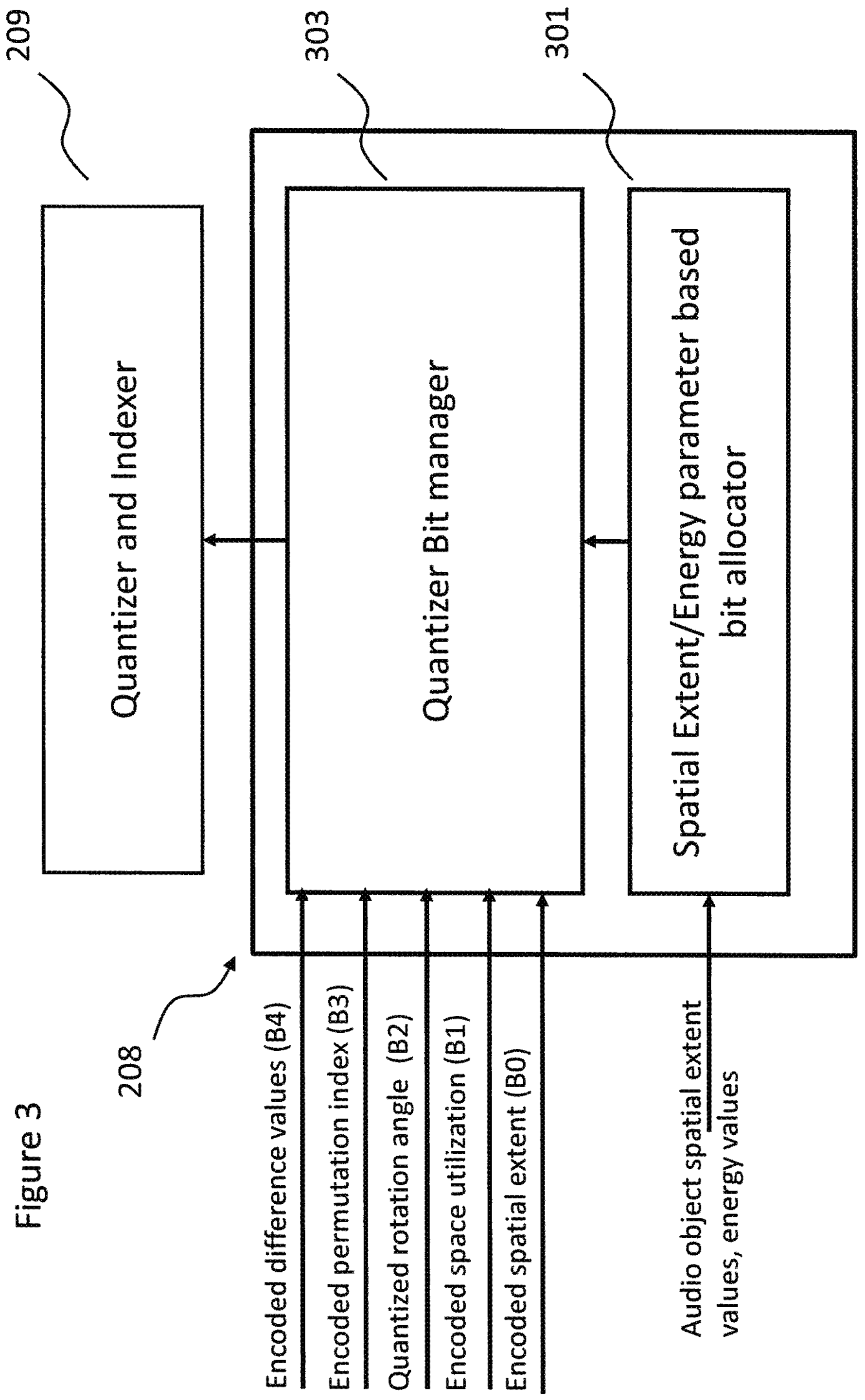
FIG. 3 shows schematically a quantizer resolution determiner as shown in FIG. 1 according to some embodiments.

With respect to FIG. 3 an example quantizer resolution determiner 208 is shown in further detail. The quantizer resolution determiner 208 as shown in FIG. 3 in some embodiments comprises a spatial extent/energy parameter bit allocator 301. The spatial extent/energy parameter bit allocator 301 can be configured to receive the audio object spatial extent values (which describes the spatial extent of each of the audio objects) and determine an (initial) quantization resolution value for the quantization of the difference value between the element of the rotated vector associated with the audio object and the audio object. For example in some embodiments the (initial) quantization resolution value can be a first quantization level when the spatial extent (the perception of the "size" or "range" of the audio object) is a first value and then a second quantization level when the spatial extent is a second value. In some embodiments for larger values of the spatial extent, lower quantization resolution levels are determined to be used for the angle difference quantization. This is because the directional errors are perceived differently for different spatial extents where as the spatial extent progresses from 0 degrees (a point source) to 180 degrees (a hemisphere source) then the directional error in order to perceived increases.

In some embodiments the determination may be based on a look-up table or other formulation such as:

| Spatial extent | Number of bits for angle difference values |
|---|---|
| 0 | 11 |
| 5 | 10 |
| 10 | 9 |
| 20 | 8 |
| 30 | 8 |
| 40 | 7 |
| 50 | 6 |

-continued

| Spatial extent | Number of bits for angle difference values |
|---|---|
| 60 | 6 |
| 90 | 5 |
| 120 | 4 |
| 180 | 0 |

The number of bits shown above may be based on a cumulated number of bits for both azimuth and elevation quantization. The values in the table are given as example and may be adjusted (dynamically) depending on the total bitrate of the codec.

Furthermore in some embodiments the spatial extent/energy parameter bit allocator 301 can be configured to modify the quantization level based on audio signal (energy/power/amplitude) levels associated with the audio object. Thus for example the quantization resolution can be lowered where the signal level is lower than a determined threshold or increased where the signal level is higher than a determined threshold. These determined thresholds may be static or dynamic and may be relative to the signal levels for each audio object. In some embodiments the signal level is estimated using the energy of the signal as given by the mono codec for the object multiplied by the gain of the considered audio object.

In some embodiments the spatial extent/energy parameter bit allocator 301 can output the number of bits to be used to a quantizer bit manager 303.

The quantizer resolution determiner 208 as shown in FIG. 3 in some embodiments comprises a quantizer bit manager. The quantizer bit manager is configured to receive the number of bits used for the encoded difference values (B4), the encoded permutation index (B3), the quantized rotation angle (B2), the encoded space utilization (B1) and the encoded spatial extents (B0) and compare these against an available number of bits for the object metadata.

When the number of bits used is more than the available number of bits for the object metadata then the quantization resolution number of bits used can be reduced. In some embodiments the reduction of the quantization resolution can be performed such that the resolution is reduced gradually by 1 bit (for instance) starting with an object having a lower signal level (which can for example be determined by a signal energy multiplied by the gain), until the available number of bits for metadata is reached.

The managed bits value for the quantization resolution can then be output to the quantizer and indexer 209.

In some embodiments the audio object encoder 121 can also comprise a (spherical) quantizer & indexer 209. The (spherical) quantizer & indexer 209 may in some embodiments furthermore receive the directional difference vector $(\Delta\theta_i,\Delta\phi_i)$ associated with each audio object and quantize these values using a suitable quantization operation based on the quantization resolution provided by the quantization resolution determiner 208. Thus for each object directional differences with respect to the components of the rotated super-codevector $\widehat{SP}$ are calculated. The differences can be quantized in the spherical grid corresponding to 11 bits (for 2.5 degrees resolution) by assigning the azimuth difference to the elevation components and the elevation difference to the elevation component. Alternatively in some embodiments the quantization of the differences can be implemented with a scalar quantizer for each component.

Figure 4:
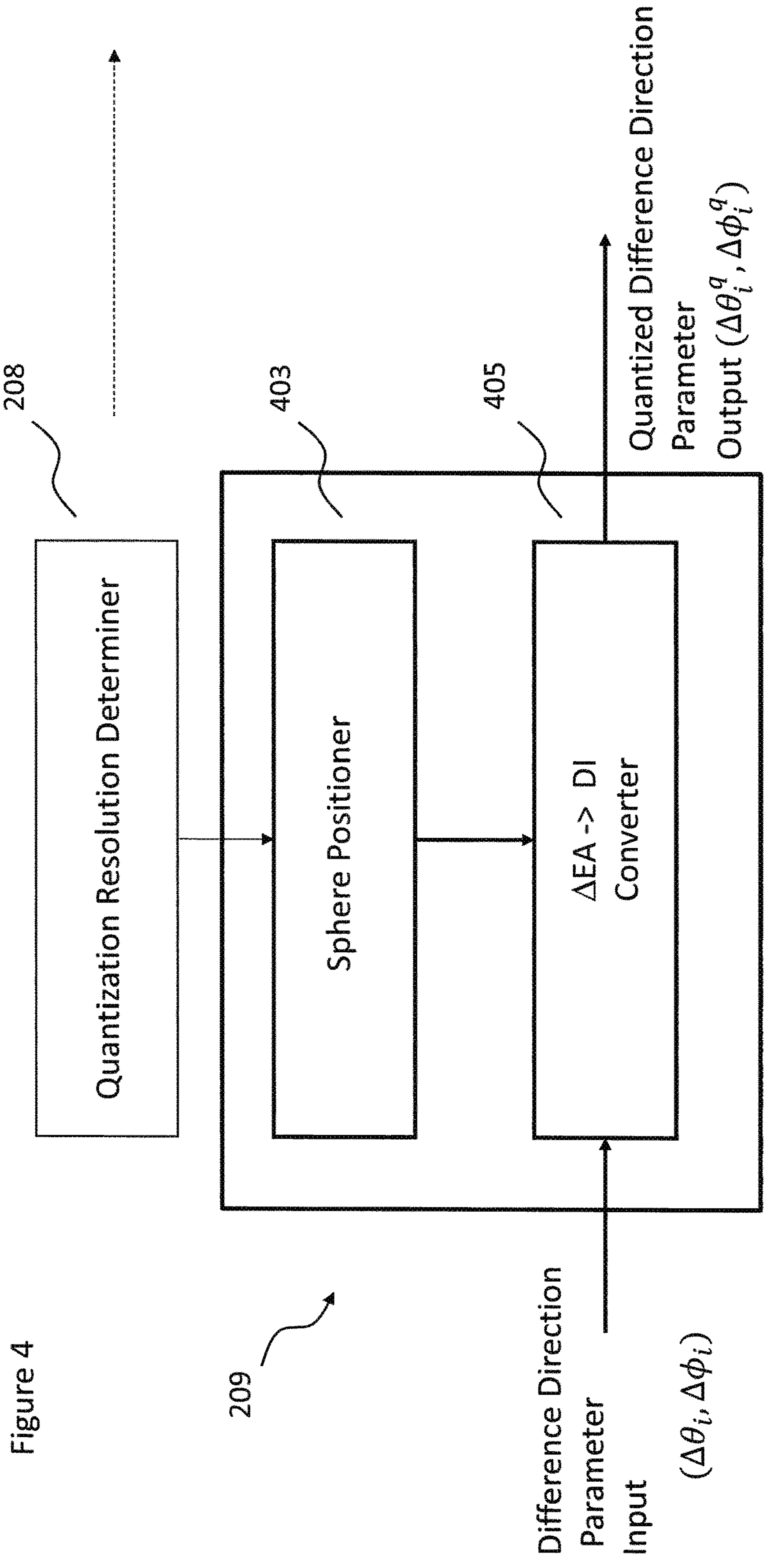
FIG. 4 shows schematically a spherical quantizer & indexer implemented as shown in FIG. 2 according to some embodiments.

An example (spherical) quantizer & indexer 209 is shown in more detail in FIG. 4 where the directional difference vector is shown as being passed to the spherical quantizer 209.

The following section describes a suitable spherical quantization scheme for indexing the directional difference vector $(\Delta\theta_i,\Delta\phi_i)$ for each audio object.

In the following text the input to the quantizer is generally referred to as $(\theta,\phi)$ in order to simplify the nomenclature and because the method can be used for any elevation azimuth pair.

The quantizer & indexer 209 in some embodiments comprises a sphere positioner 403. The sphere positioner is configured to configure the arrangement of spheres based on the quantization resolution value from the quantization determiner. The proposed spherical grid uses the idea of covering a sphere with smaller spheres and considering the centres of the smaller spheres as points defining a grid of almost equidistant directions.

Figure 5:
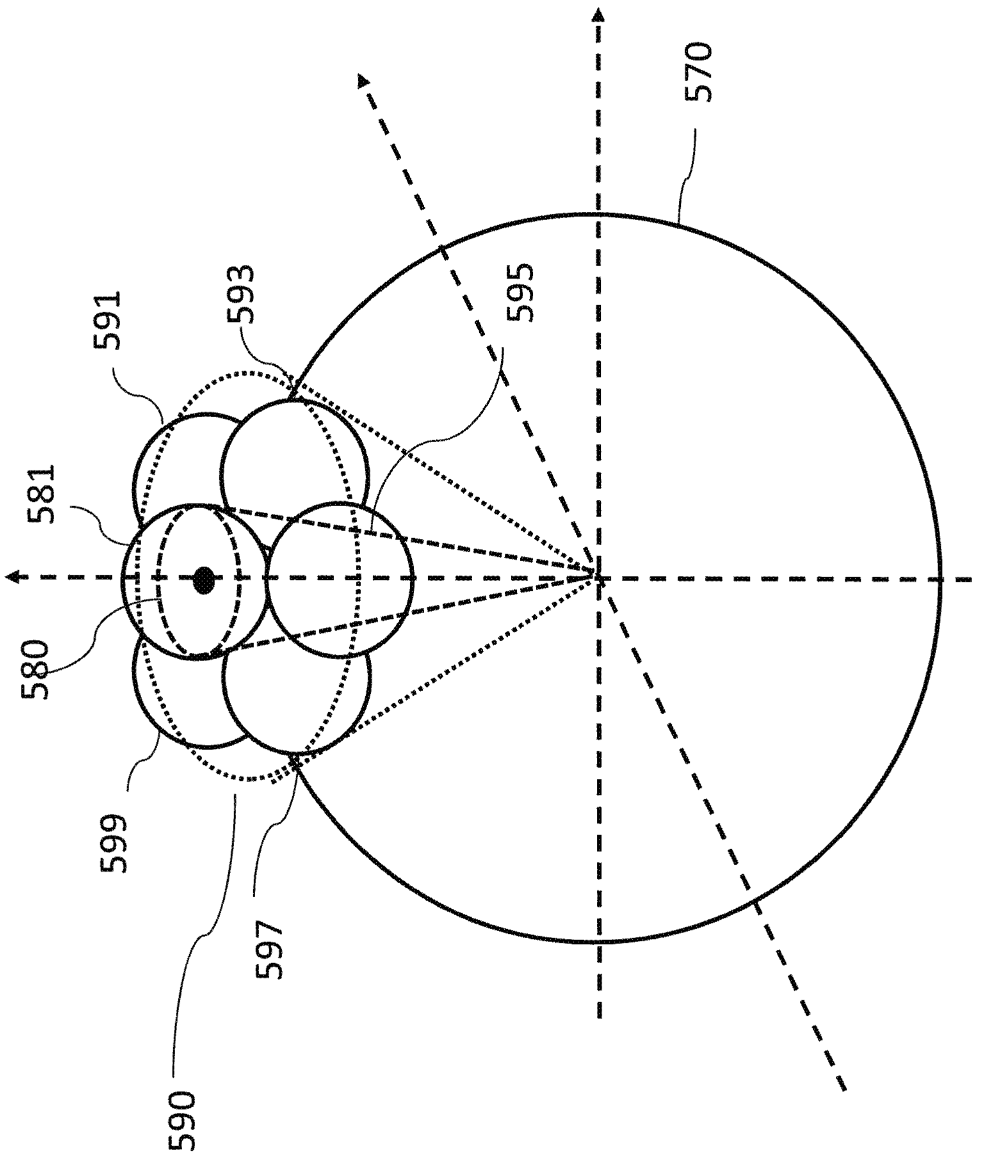
FIG. 5 shows schematically example sphere location configurations as used in the spherical quantizer & indexer and the spherical de-indexer as shown in FIG. 4 according to some embodiments.

The sphere may be defined relative to the reference location and a reference direction. The sphere can be visualised as a series of circles (or intersections) and for each circle intersection there are located at the circumference of the circle a defined number of (smaller) spheres. This is shown for example with respect to FIG. 5. For example, FIG. 5 shows an example 'polar' reference direction configuration which shows a first main sphere 570 which has a radius defined as the main sphere radius. Also shown in FIG. 5 are the smaller spheres (shown as circles) 581, 591, 593, 595, 597 and 599 located such that each smaller sphere has a circumference which at one point touches the main sphere circumference and at least one further point which touches at least one further smaller sphere circumference. Thus, as shown in FIG. 5 the smaller sphere 581, touches main sphere 570 and smaller spheres 591, 593, 595, 597, and 599. Furthermore, smaller sphere 581 is located such that the centre of the smaller sphere is located on the +/−90 degree elevation line (the z-axis) extending through the main sphere 570 centre.

The smaller spheres 591, 593, 595, 597 and 599 are located such that they each touch the main sphere 570, the smaller sphere 581 and additionally a pair of adjacent smaller spheres. For example the smaller sphere 591 additionally touches adjacent smaller spheres 599 and 593, the smaller sphere 593 additionally touches adjacent smaller spheres 591 and 595, the smaller sphere 595 additionally touches adjacent smaller spheres 593 and 597, the smaller sphere 597 additionally touches adjacent smaller spheres 599 and 591, and the smaller sphere 599 additionally touches adjacent smaller spheres 597 and 591.

The smaller sphere 581 therefore defines a cone 580 or solid angle about the +90 degree elevation line and the smaller spheres 591, 593, 595, 597 and 599 define a further cone 590 or solid angle about the +90 degree elevation line, wherein the further cone is a larger solid angle than the cone.

In other words the smaller sphere 581 (which defines a first circle of spheres) may be considered to be located at a first elevation (with the smaller sphere centre +90 degrees), and the smaller spheres 591, 593, 595, 597 and 599 (which define a second circle of spheres) may be considered to be located a second elevation (with the smaller sphere centres<90 degrees) relative to the main sphere and with an elevation lower than the preceding circle.

This arrangement may then be further repeated with further circles of touching spheres located at further elevations relative to the main sphere and with an elevation lower than the preceding circles.

The sphere positioner 403 thus in some embodiments be configured to perform the following operations to define the directions corresponding to the covering spheres:

Input: angle resolution for elevation, $\partial\theta$ (ideally such that $$\frac{\pi}{2\partial\theta}$$

is integer)

Output: number of circles, Nc, and number of points on each circle, n(i), i=0, Nc−1

1. n (0) = 1
2. $M = \left[\frac{\pi}{2\partial\theta}\right]$
3. For i =1:M−1
   a. $n(i) = \pi\ \sin(\partial\theta \cdot i) / \sin\frac{\partial\theta}{2}$
   b. $\theta(i) = \frac{\pi}{2} - i \cdot \partial\theta$ (elevation)
   c. $\partial\phi(i) = 2\ \pi/n(i)$
   d. If i is odd
      i. $\phi_i(0) = 0$
   e. Else
      i. $\phi_i(0) = \frac{\partial\phi(i)}{2}$ (first azimuth value on circle $i$)
   f. End if
4. End for Thus, according to the above the elevation for each point on the circle i is given by the values in $\theta(i)$. For each circle above the Equator there is a corresponding circle under the Equator (the plane defined by the X-Y axes).

Furthermore, as discussed above each direction point on one circle can be indexed in increasing order with respect to the azimuth value. The index of the first point in each circle is given by an offset that can be deduced from the number of points on each circle, n(i). In order to obtain the offsets, for a considered order of the circles, the offsets are calculated as the cumulated number of points on the circles for the given order, starting with the value 0 as first offset.

In other words, the circles are ordered starting from the "North Pole" downwards.

In another embodiment the number of points along the circles parallel to the Equator $$n(i) = \pi \sin(\partial\theta \cdot i)/\sin\frac{\partial\theta}{2}$$

can also be obtained by $$n(i) = \pi \sin(\partial\theta \cdot i)/\left(\lambda_i \sin\frac{\partial\theta}{2}\right),$$

where $\lambda_i \geq 1$, $\lambda_i \leq \lambda_{i+1}$. In other words, the spheres along the circles parallel to the Equator have larger radii as they are further away from the North pole, i.e. they are further away from North pole of the main direction.

The sphere positioner having determined the number of circles and the number of circles, Nc, number of points on each circle, n(i), i=0, Nc−1 and the indexing order can be configured to pass this information to an ΔEA to DI converter 405.

The transformation procedures from (elevation/azimuth) (ΔEA) to direction index (DI) and back are presented in the following paragraphs.

The direction metadata encoder 209 in some embodiments comprises a delta elevation-azimuth to direction index (ΔEA-DI) converter 405. The delta elevation-azimuth to direction index converter 305 in some embodiments is configured to receive the difference direction parameter input direction parameter input $(\Delta\theta_i, \Delta\phi_i)$ and the sphere positioner information and convert the difference direction (elevation-azimuth) value to a difference direction index by quantizing the difference direction value.

The quantized difference direction parameter index $I_d = (\Delta\theta_i^q, \Delta\phi_i^q)$ may be output to an entropy/fixed rate encoder 213.

In some embodiments the audio object encoder 121 can also comprise an entropy/fixed rate encoder 213. The entropy/fixed rate encoder 213 is configured to receive the quantized difference direction parameter index $I_d = (\Delta\theta_i^q, \Delta\phi_i^q)$ and encode these values in a suitable manner. In some embodiments the quantized difference direction parameter index $I_d = (\Delta\theta_i^q, \Delta\phi_i^q)$ for each object is entropy encoded (for example using a Golomb Rice mean removed encoding) and furthermore using a fixed rate encoding. The encoder 213 may then be configured to determine which of the methods uses the fewer number of bits and chooses this method and furthermore signals this selection as well as the encoded quantized difference direction parameter index $I_d = (\Delta\theta_i^q, \Delta\phi_i^q)$ values.

Figure 6A:
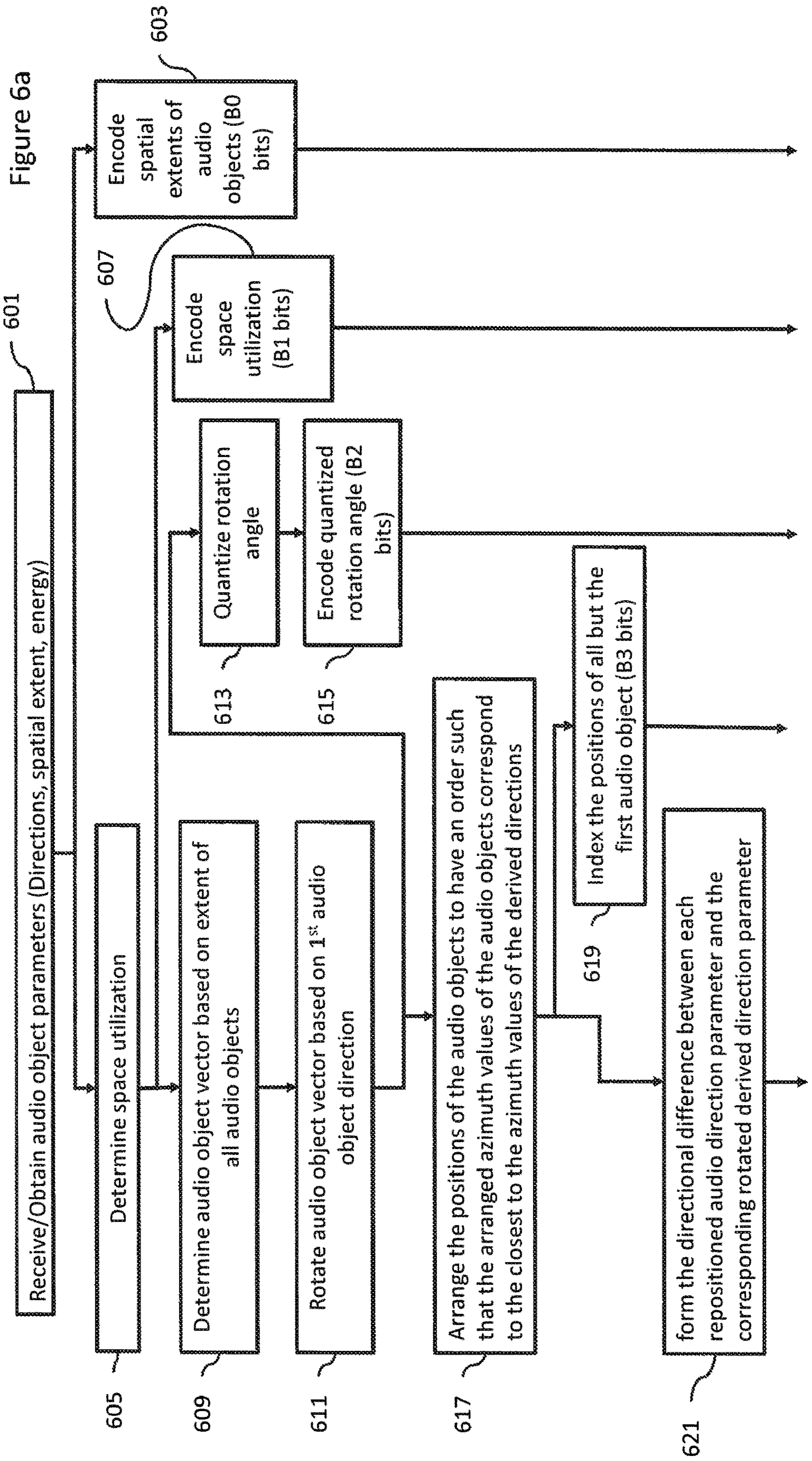
FIGS. 6*a* and 6*b* show flow diagrams of the operation of the audio object encoder as shown in FIG. 2 according to some embodiments.
Figure 6B:
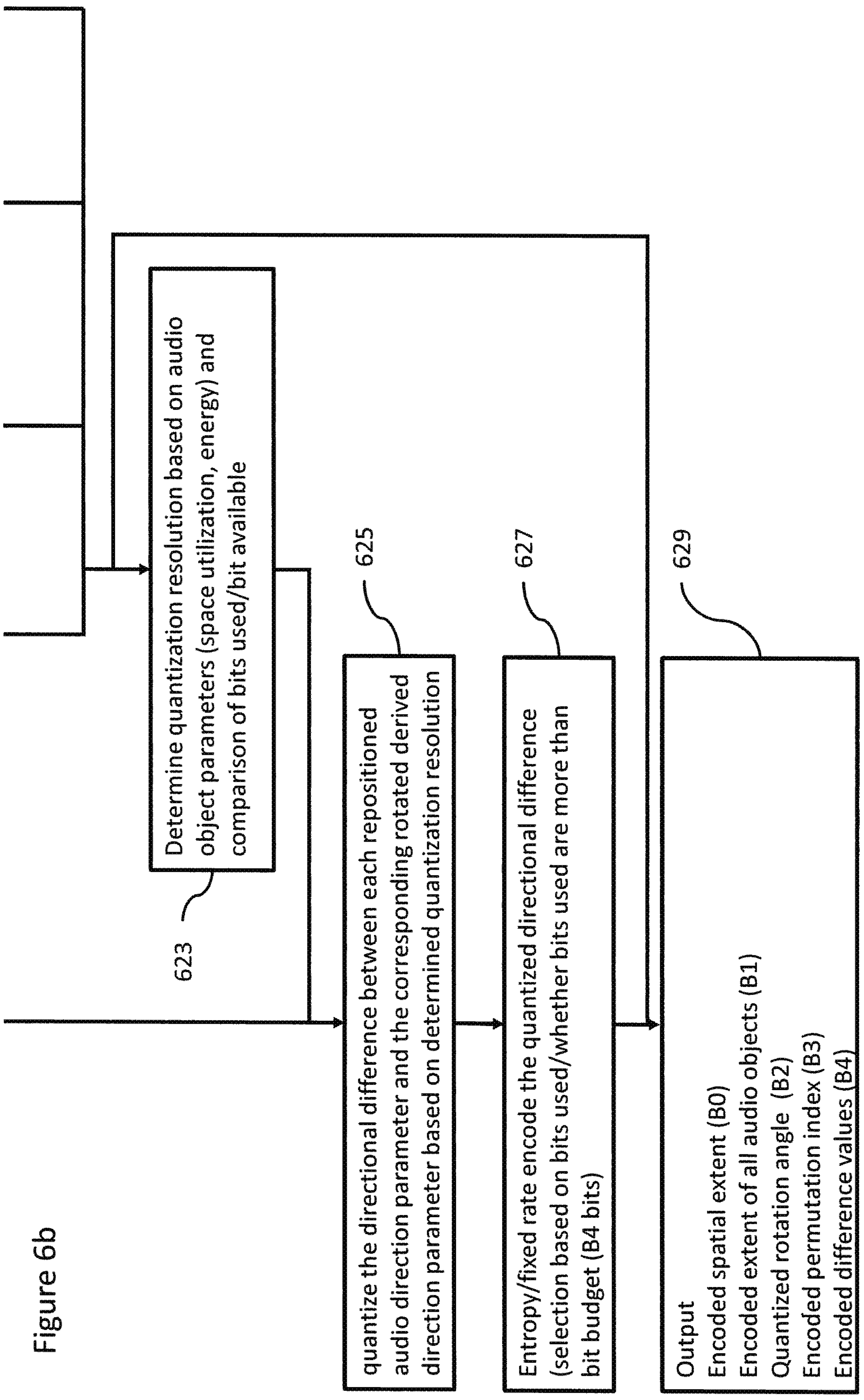

With respect to FIGS. 6*a* and 6*b* is shown a flow diagram showing the operations of the audio object encoder 121.

The first operation may be the receiving/obtaining of the audio object parameters (such as directions, spatial extent and energy) as shown in FIG. 6*a* by step 601.

The spatial extents of the audio objects can then be encoded (B0 bits) as shown in FIG. 6*a* by step 603.

The spatial utilization can then be determined as shown in FIG. 6*a* by step 605.

The spatial utilization can then be encoded (B1 bits) as shown in FIG. 6*a* by step 607.

Then the audio object vector can be determined based on the spatial utilization as shown in FIG. 6*a* by step 609.

The audio object vector can then be rotated based on the 1st audio object direction as shown in FIG. 6*a* by step 611.

The rotation angle can then be quantized as shown in FIG. 6*a* by step 613.

The quantized rotation angle can then be encoded (B2 bits) as shown in FIG. 6*a* by step 615.

Following the rotation of the audio object vector the positions of the audio objects can be arranged to have an order such that the arranged azimuth values of the audio objects correspond to the closest to the azimuth values of the derived directions as shown in FIG. 6*a* by step 617.

The re-positioned audio objects can be indexed and the permutation of the indices can be encoded (B3 bits) as shown in FIG. 6*a* by step 619.

The directional difference between each repositioned audio direction parameter and the corresponding rotated derived direction parameter (taking account of the quantization of the rotation angle) can then be formed as shown in FIG. 6*a* by step 621.

A quantization resolution based on audio object parameters (spatial extent, energy) and comparison of bits used/bit available can then be determined as shown in FIG. 6*b* by step 623.

Then the directional difference between each repositioned audio direction parameter and the corresponding rotated derived direction parameter can be quantized as shown in FIG. 6*b* by step 625.

The quantized directional difference can then be encoded using a suitable encoding, for example using an entropy encoding or fixed rate encoding where a selection is based on bits used/whether the number of bits used are more than bit budget (B4 bits) as shown in FIG. 6*b* by step 627.

The method may then output the encoded spatial extent (B0), encoded extent of all audio objects (B1), quantized rotation angle (B2), encoded permutation index (B3) and encoded difference values (B4).

An example encoding algorithm may thus be summarized as:

1. Encode the spatial extent using B0 bits
2. Check spatial utilization, if the objects are situated in the entire space, or only in one hemisphere, or maybe only in quarter of the space. Encode this info with B1 = 1 or 2 bits.
3. Calculate the super-codevector rotation such that the quantization is minimized
4. Quantize the rotation angle with a number of bits depending on the choice of the super-codevector (if all the space is used, then use B2 = 7 bits for rotation in the horizontal space, B2 = 6 bits if only one hemisphere is used)
5. Encode the permutation corresponding to the order of the last N-1 objects.
6. Encode the rotation angle jointly with the permutation index with B3 bits
7. Calculate for all active objects the direction differences (elevation and azimuth) with respect to the components of the rotated super-codevector
8. Set the number of bits to be used for the differences as B4_i, for each object i, given in Table 1, based on the spatial extent value of each object.
9. If B1 + B3 + B4 + 1 + B0 > available number of bits for the object metadata
   a. Further reduce the number of bits B4_i gradually by 1 bit (for instance) starting with the objects having the lower signal level (signal energy multiplied by the gain), until the available number of bits for metadata is reached.
10. End
11. Quantize the direction differences using the number of bits
12. Entropy encode the difference elevation and azimuth indexes using Golomb Rice mean removed encoding.
13. If the number of bits resulted from the entropy encoding is larger than B4
    a. Use B4_i bits for fixed rate encoding the differences (using the scalar quantizers, or the spherical grid quantizer) and add 1 bit for signaling
14. Else
    a. Use the entropy coding and add a bit for signaling
15. End In principle the spatial extent relates mostly to the horizontal direction and is less perceived on the vertical one. Should both a vertical and horizontal spatial extent be defined and sent, the angle resolution of the differences can be adjusted separately for the azimuth and the elevation.

Figure 7:
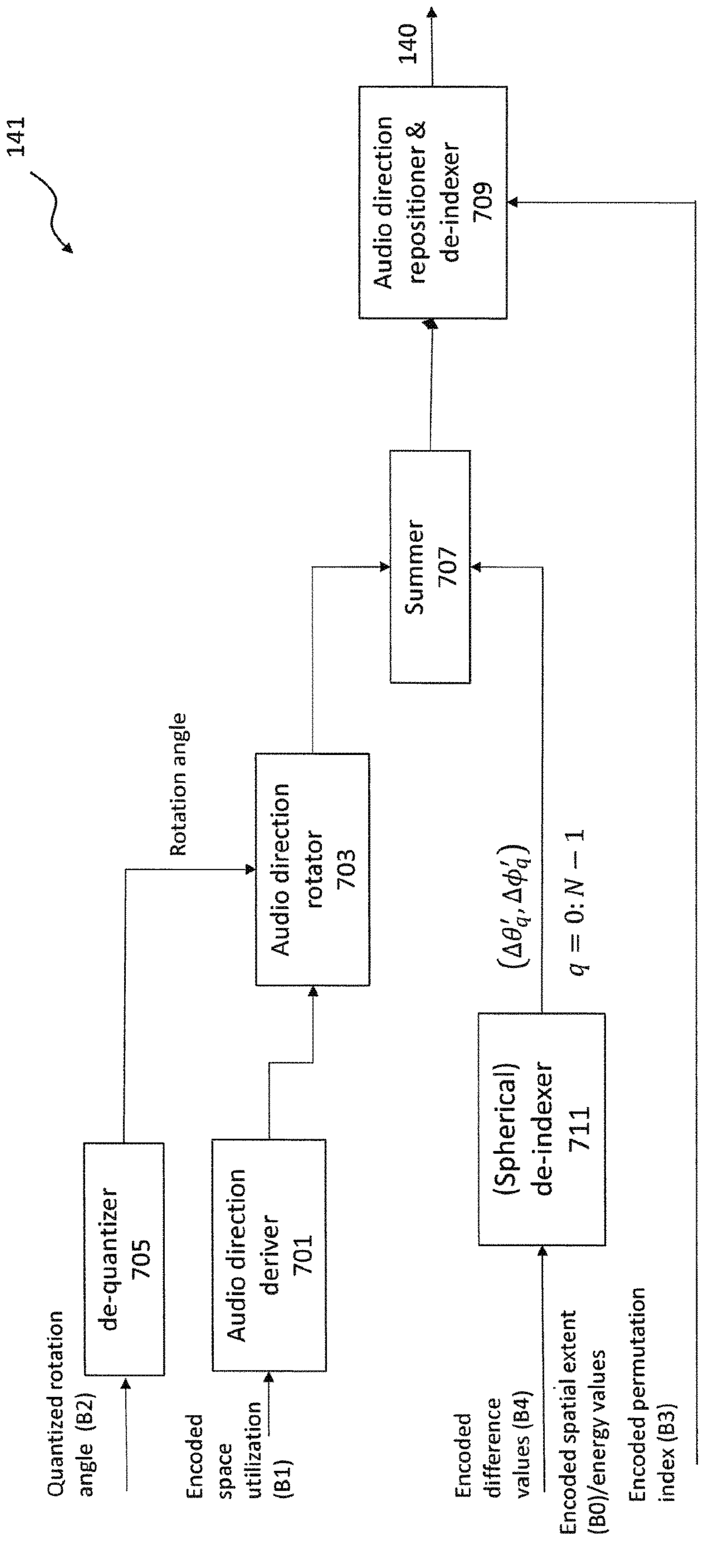
FIG. 7 shows schematically the audio object decoder as shown in FIG. 1 according to some embodiments.

With respect to FIG. 7 there is shown an audio object decoder 141 as shown in FIG. 1. As can be seen the audio object decoder 141 can be arranged to receive from the encoded bitstream the encoded spatial extent (B0), encoded extent of all audio objects (B1), quantized rotation angle (B2), encoded permutation index (B3) and encoded difference values (B4).

The audio object decoder 141 in some embodiments comprises a dequantizer 705. The dequantizer 705 is configured to receive the quantized/encoded rotation angle and generate a rotation angle which is passed to an audio direction rotator 703.

The audio object decoder 141 in some embodiments comprises an audio direction deriver 701. The audio object decoder 141 can comprise an audio direction deriver 701 which has the same function as the audio direction deriver 201 at the encoder 121. In other words, audio direction deriver 701 can be arranged to form and initialise an SP vector in the same manner as that performed at the encoder. That is each derived audio direction component of the SP vector is formed under the premise that the directional information of the audio objects can be initialised as a series of points evenly distributed along the circumference of a unit circle starting at an azimuth value of 0°. The SP vector containing the derived audio directions may then be passed to the audio direction rotator 703.

The audio direction deriver 701 is configured to receive the Encoded extent of all audio objects (B1) and from this determine a "template" or derived direction vector in the same manner as described in the encoder. The vector SP can then be passed to the audio direction rotator 703.

The audio object decoder 141 in some embodiments comprises an audio direction rotator 703. The audio direction rotator 703 is configured to receive the (SP) audio direction vector and the quantized rotation angle and rotate the audio directions to generate a rotated audio direction vector which can be passed to the summer 707.

The audio object decoder 141 in some embodiments comprises a (spherical) de-indexer 711. The (spherical) de-indexer 711 is configured to receive the encoded difference values and generate decoded difference values by applying a suitable decoding and deindexing. The decoded difference values can then be passed to the summer 707.

The audio object decoder 141 in some embodiments comprises a summer 707. The summer 707 is configured to receive the decoded difference values and the rotated vector to generate a series of object directions which are passed to an audio direction repositioner and deindexer 709. The quantised directional vector for each audio object can for example be formed by summing for each audio object $P_q$ q=0:N−1 the quantised directional vector $(\Delta\theta_q', \Delta\phi_q')$ with the corresponding rotated derived audio direction $$0, q \cdot \frac{360}{N} + \phi_0'$$

(from the dequantized rotated derived audio direction "template" vector $\widehat{SP}'$.) This can be expressed as.

$$(\theta_q', \phi_q') = (\Delta\theta_q' + \hat{\theta}_q', \Delta\phi_q' + \widehat{\phi_q}')\, q = 0:N-1$$

For those embodiments in which a rotation is produced for just the azimuth value, that is the elevation component is 0 for each element of the "template" codevector SP the above equation reduces to $$(\theta_q', \phi_q') = (\Delta\theta_q' + \Delta\phi_q' + \widehat{\phi_q}')\, q = 0:N-1$$

The audio object decoder 141 in some embodiments comprises an audio direction repositioner and deindexer 709. The audio direction repositioner and deindexer 709 is configured to receive the object directions from the summer 707 and the encoded permutation indices and from this output a reordered audio object direction vector which can then be output. In other words in some embodiments the audio direction de-indexer and re-positioner 709 can be configured to decode the index $I_{ro}$ in order to find the particular permutation of indices of the re-ordered audio directions. This permutation of indices may then be used by the audio direction de-indexer and re-positioner 709 to reorder the audio direction parameters back to their original order, as first presented to the audio object encoder 121. The output from audio direction de-indexer and re-positioner 709 may therefore be the ordered quantised audio directions associated with the N audio objects. These ordered quantised audio parameters may then form part of the decoded multiple audio object stream 140.

Figure 8:
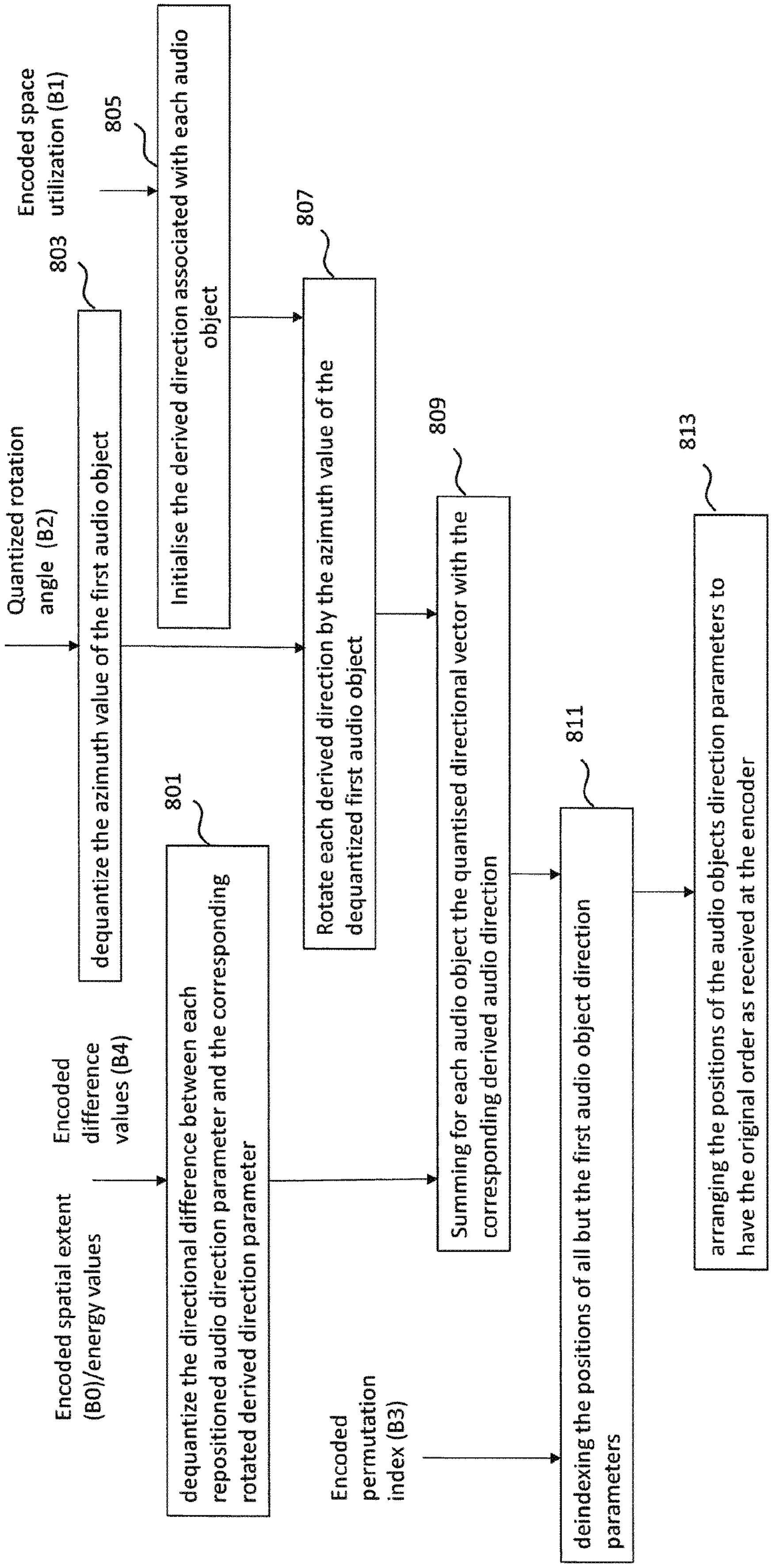
FIG. 8 shows a flow diagram of the operation of the audio object decoder as shown in FIG. 7 according to some embodiments.

Associated with FIG. 7 there is FIG. 8 which depicts the processing steps of the audio object decoder 141.

The step of dequantizing the directional difference between each repositioned audio direction parameter and the corresponding rotated derived direction parameter (based on the quantization resolution determined in the manner similar to the encoder) is depicted in FIG. 8 as processing step 801.

The step of dequantizing the azimuth value of the first audio object is shown as processing step 803 in FIG. 8.

With reference to FIG. 8 the step of initialising the derived direction associated with each audio object is shown as processing step 805.

With reference to FIG. 8 the processing step 807 represents the rotating of each derived direction by the azimuth value of the dequantized first audio object.

The processing step of summing for each audio object $P_q$ q=0:N−1 the quantised directional vector $(\Delta\theta_q', \Delta\phi_q')$ with the corresponding rotated derived audio direction is shown in FIG. 8 as step 809.

The step of deindexing the positions of all but the first audio object direction parameters is shown as processing step 811 in FIG. 8.

The step of arranging the positions of the audio objects direction parameters to have the original order as received at the encoder is shown as processing step 813 in FIG. 8.

Figure 9:
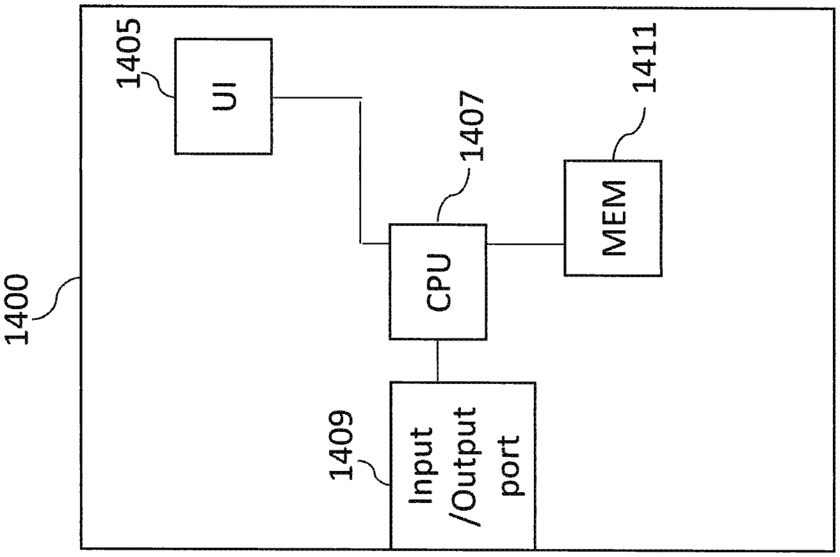
FIG. 9 shows schematically an example device suitable for implementing the apparatus shown.

With respect to FIG. 9 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus to:

obtain a plurality of audio direction parameters associated with respective audio objects, wherein each parameter comprises an elevation value and an azimuth value and wherein each parameter has an ordered position based on an order in which the respective audio object was received;

derive for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters;

rotate each derived audio direction parameter by the azimuth value of an audio direction parameter in a first position of the plurality of audio direction parameters and quantizing the rotation to determine for each a corresponding quantized rotated derived audio direction parameter;

change the ordered position of an audio direction parameter to a further position coinciding with a position of a respective rotated derived audio direction parameter of a plurality of rotated derived audio direction parameters in an instance in which the azimuth value of the audio direction parameter is closest to the azimuth value of the respective rotated derived audio direction parameter in comparison to the azimuth values of other rotated derived audio direction parameters of the plurality of rotated derived audio direction parameters;

determine for each of the plurality audio direction parameters a difference between each audio direction parameter and their corresponding quantized rotated derived audio direction parameter;

quantize the difference for each of the plurality of audio direction parameters, wherein a resolution of the difference, as quantized for each of the plurality of audio direction parameters, is defined based on a spatial extent of the audio direction parameters; and transmit positions of the audio objects after having changed the ordered position of an audio direction parameter associated with a respective audio object to the further position.

2. The apparatus for spatial audio signal encoding, as claimed in claim 1, wherein the apparatus caused to derive for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters is caused to derive the azimuth value of each derived audio direction parameter corresponding with a position of a plurality of positions around the circumference of a circle.

3. The apparatus for spatial audio signal encoding, as claimed in claim 1 wherein the plurality of positions around the circumference of the circle are evenly distributed along one of:

360 degrees of the circle when the spatial utilization defined by the elevation values and the azimuth values of the plurality of audio direction parameters occupy more than a hemisphere;

180 degrees of the circle when the spatial utilization defined by the elevation values and the azimuth values of the plurality of audio direction parameters occupy less than a hemisphere;

90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

4. The apparatus for spatial audio signal encoding, as claimed in claim 3 wherein the number of positions around a circumference of the circle is determined by a determined number of audio direction parameters.

5. The apparatus for spatial audio signal encoding, as claimed in claim 1, wherein the apparatus caused to rotate each derived audio direction parameter by the azimuth value of a first audio direction parameter of the plurality of audio direction parameters is caused to add the azimuth value of the first audio direction parameter to the azimuth value of each derived audio direction parameter, wherein the elevation value of each derived audio direction parameter is set to zero.

6. The apparatus for spatial audio signal encoding, as claimed in claim 1 wherein the apparatus caused to quantize the rotation to determine for each a corresponding quantized rotated derived audio direction parameter is further caused to scalar quantize the azimuth value of a first audio direction parameter; and the apparatus is further caused to index the positions of the audio direction parameters after the changing the ordered position by assigning an index to a permutation of indices representing the order of the positions of the audio direction parameters.

7. The apparatus for spatial audio signal encoding, as claimed in claim 1, wherein the apparatus caused to determine for each of the plurality audio direction parameters a difference between each audio direction parameter and their corresponding quantized rotated derived audio direction parameter is further caused to:

determine for each of the plurality of audio direction parameters a difference audio direction parameter based on at least:

determine a difference between the first positioned audio direction parameter and the first positioned rotated derived audio direction parameter; and/or determine a difference between a further audio direction parameter and a rotated derived audio direction parameter, wherein the position of the further audio direction parameter is unchanged; and/or determine a difference between a yet further audio direction parameter and a rotated derived audio direction parameter wherein the position of the yet further audio direction parameter has been changed to the position of the rotated derived audio direction parameter.

8. The apparatus for spatial audio signal encoding, as claimed in claim 1, wherein the apparatus caused to change the position of an audio direction parameter to a further position applies to any audio direction parameter but the first positioned audio direction parameter.

9. The apparatus for spatial audio signal encoding, as claimed in claim 1, wherein the apparatus caused to quantize a difference for each of the plurality of audio direction parameters, wherein a difference quantization resolution for each of the plurality of audio direction parameters is defined based on the spatial extent of the audio direction parameters that is caused to quantize the difference audio direction parameter for each of the at least three audio direction parameters as a vector being indexed to a codebook comprising a plurality of indexed elevation values and indexed azimuth values.

10. The apparatus for spatial audio signal encoding, as claimed in claim 9, wherein the plurality of indexed elevation values and indexed azimuth values are points on a grid arranged in a form of a sphere, wherein the spherical grid is formed by covering the sphere with smaller spheres, wherein the smaller spheres define the points of the spherical grid.

11. The apparatus for spatial audio signal encoding as claimed in claim 1, wherein the apparatus caused to obtain a plurality of audio direction parameters is caused to receive the plurality of audio direction parameters.

12. An apparatus comprising at least one processor and at least one memory including computer program code, the at least one memory and the computer program code configured to, with the at least one processor, cause the apparatus to:

obtain an encoded spatial audio signal;

determine a configuration of directional values based on an encoded space utilization parameter within the encoded spatial audio signal;

determine a rotation angle based on an encoded rotation parameter within the encoded spatial audio signal;

apply the rotation angle to the configuration of directional values to generate a rotated configuration of directional values, the rotated configuration of directional values comprising a first directional value and second and further directional values;

determine one or more difference values based on encoded difference values and encoded spatial extent values;

apply the one or more difference values to respective second and further respective directional values to generate modified second and further directional values; and reorder the modified second and further directional values based on an encoded permutation index within the encoded spatial audio signal, such that the first directional value and the reordered modified second and further directional values define audio direction parameters for audio objects.

13. The apparatus for spatial audio signal decoding, as claimed in claim 12, wherein the apparatus caused to determine a configuration of directional values based on the encoded space utilization parameter within the encoded spatial audio signal is caused to derive an azimuth value of each derived audio direction parameter corresponding with a position of a plurality of positions around the circumference of a circle.

14. The apparatus for spatial audio signal decoding, as claimed in claim 13, wherein the plurality of positions around the circumference of the circle are evenly distributed along one of:

360 degrees of the circle when the encoded spatial utilization parameter within the encoded spatial audio signal indicates elevation values and azimuth values of audio direction parameters occupy more than a hemisphere;

180 degrees of the circle when the encoded spatial utilization parameter within the encoded spatial audio signal indicates elevation values and azimuth values of audio direction parameters occupy less than a hemisphere;

90 degrees of the circle when the encoded spatial utilization parameter within the encoded spatial audio signal indicates elevation values and azimuth values of audio direction parameters occupy less than a quadrant of a sphere; and a defined number of degrees of the circle when the encoded spatial utilization parameter within the encoded spatial audio signal indicates elevation values and azimuth values of audio direction parameters occupy less than a threshold range of angles of a sphere.

15. The apparatus for spatial audio signal decoding, as claimed in claim 14 wherein the number of positions around a circumference of the circle is determined by a determined number of audio direction parameters.

16. A method for spatial audio signal encoding comprising:

obtaining a plurality of audio direction parameters associated with respective audio objects, wherein each parameter comprises an elevation value and an azimuth value and wherein each parameter has an ordered position based on an order in which the respective audio object was received;

deriving for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters;

rotating each derived audio direction parameter by the azimuth value of an audio direction parameter in a first position of the plurality of audio direction parameters and quantizing the rotation to determine for each a corresponding quantized rotated derived audio direction parameter;

changing the ordered position of an audio direction parameter to a further position coinciding with a position of a respective rotated derived audio direction parameter of a plurality of rotated derived audio direction parameters in an instance in which the azimuth value of the audio direction parameter is closest to the azimuth value of the respective rotated derived audio direction parameter in comparison to the azimuth values of other rotated derived audio direction parameters of the plurality of rotated derived audio direction parameters;

determining for each of the plurality audio direction parameters a difference between each audio direction parameter and their corresponding quantized rotated derived audio direction parameter;

quantizing the difference for each of the plurality of audio direction parameters, wherein a resolution of the difference, as quantized for each of the plurality of audio direction parameters, is defined based on a spatial extent of the audio direction parameters; and transmitting positions of the audio objects after having changed the ordered position of an audio direction parameter associated with a respective audio object to the further position.

17. The method for spatial audio signal encoding, as claimed in claim 16, wherein deriving for each of the plurality of audio direction parameters a corresponding derived audio direction parameter comprising an elevation and an azimuth value, corresponding derived audio direction parameters being arranged in a manner determined by a spatial utilization defined by the elevation values and the azimuth values of the plurality of audio direction parameters comprises deriving the azimuth value of each derived audio direction parameter corresponding with a position of a plurality of positions around the circumference of a circle.

18. The method for spatial audio signal encoding, as claimed in claim 16, wherein the plurality of positions around the circumference of the circle are evenly distributed along one of:

360 degrees of the circle when the spatial utilization defined by the elevation values and the azimuth values of the plurality of audio direction parameters occupy more than a hemisphere;

180 degrees of the circle when the spatial utilization defined by the elevation values and the azimuth values of the plurality of audio direction parameters occupy less than a hemisphere;

90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

19. The method for spatial audio signal encoding, as claimed in claim 18 wherein the number of positions around a circumference of the circle is determined by a determined number of audio direction parameters.

20. A method for spatial audio signal decoding comprising:

obtaining an encoded spatial audio signal;

determining a configuration of directional values based on an encoded space utilization parameter within the encoded spatial audio signal;

determining a rotation angle based on an encoded rotation parameter within the encoded spatial audio signal;

applying the rotation angle to the configuration of directional values to generate a rotated configuration of directional values, the rotated configuration of directional values comprising a first directional value and second and further directional values;

determining one or more difference values based on encoded difference values and encoded spatial extent values;

applying the one or more difference values to respective second and further respective directional values to generate modified second and further directional values; and reordering the modified second and further directional values based on an encoded permutation index within the encoded spatial audio signal, such that the first directional value and the reordered modified second and further directional values define audio direction parameters for audio objects.

* * * * *